United States Patent
Mayster

(10) Patent No.: US 11,971,269 B2
(45) Date of Patent: Apr. 30, 2024

(54) CONSTRAINED NAVIGATION AND ROUTE PLANNING

(71) Applicants: Google LLC, Mountain View, CA (US); Yan Mayster, Aurora, CO (US)

(72) Inventor: Yan Mayster, Aurora, CO (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/764,748

(22) PCT Filed: Dec. 19, 2019

(86) PCT No.: PCT/US2019/067348
§ 371 (c)(1),
(2) Date: May 15, 2020

(87) PCT Pub. No.: WO2021/126197
PCT Pub. Date: Jun. 24, 2021

(65) Prior Publication Data
US 2022/0316898 A1 Oct. 6, 2022

(51) Int. Cl.
*G01C 21/34* (2006.01)
(52) U.S. Cl.
CPC ..... *G01C 21/3476* (2013.01); *G01C 21/3446* (2013.01)
(58) Field of Classification Search
None
See application file for complete search history.

(56) References Cited

U.S. PATENT DOCUMENTS

| 8,996,295 | B2 | 3/2015 | Tate, Jr. | |
| 9,008,888 | B1 * | 4/2015 | Gravino | G01C 21/3682 701/426 |

(Continued)

FOREIGN PATENT DOCUMENTS

TW 201420994 A * 6/2014

OTHER PUBLICATIONS

International Search Report and Written Opinion for Application No. PCT/US2019/067348, dated Sep. 24, 2020, 11 pages.

(Continued)

*Primary Examiner* — Jeffrey C Boomer
(74) *Attorney, Agent, or Firm* — DORITY & MANNING P.A.

(57) ABSTRACT

Methods, systems, devices, and tangible non-transitory computer readable media for route planning are provided. The disclosed technology can include accessing travel data that includes information associated with a starting location and a destination. Routes from the starting location to the destination can be determined and each of the routes can be associated regions. Travel costs associated with travelling from the starting location to the destination via each of the routes can be determined. Convenience costs associated with an availability of facilities within the regions associated with each of routes can also be determined. A travel route can be selected from the routes. The travel route can be selected based in part on the travel costs, the convenience costs, and travel criteria. The travel criteria can be associated with travel preferences. Furthermore, route data that can include information associated indications based in part on the travel route can be generated.

20 Claims, 8 Drawing Sheets

(56) References Cited

U.S. PATENT DOCUMENTS

| | | | |
|---|---|---|---|
| 10,309,795 B2 | 6/2019 | König et al. | |
| 2006/0142940 A1 | 6/2006 | Choi | |
| 2013/0046456 A1 | 2/2013 | Scofield et al. | |
| 2014/0074391 A1 | 3/2014 | Tate, Jr. | |
| 2014/0129139 A1* | 5/2014 | Ellison | B60L 53/67 |
| | | | 701/533 |
| 2015/0149078 A1* | 5/2015 | Profous | G01C 21/3446 |
| | | | 701/410 |
| 2015/0370251 A1* | 12/2015 | Siegel | B64C 39/024 |
| | | | 701/2 |
| 2018/0003516 A1* | 1/2018 | Khasis | G08G 1/207 |
| 2018/0023969 A1* | 1/2018 | Poppen | G01C 21/3415 |
| | | | 701/468 |
| 2018/0299897 A1* | 10/2018 | Cashler | G01C 21/343 |
| 2019/0227540 A1* | 7/2019 | Suvitie | G01C 21/3453 |
| 2021/0018924 A1* | 1/2021 | Szubbocsev | B60L 58/16 |
| 2021/0190526 A1* | 6/2021 | Choi | G06V 20/56 |
| 2021/0209841 A1* | 7/2021 | Park | G06N 3/08 |
| 2022/0155093 A1* | 5/2022 | Fear | G06Q 30/00 |

OTHER PUBLICATIONS

International Preliminary Report on Patentability for Application No. PCT/US2019/067348, dated Jun. 30, 2022, 8 pages.

Chinese Search Report Corresponding to Application No. 2019800236994 on Jan. 25, 2024.

* cited by examiner

CONSTRAINED NAVIGATION AND ROUTE PLANNING

PRIORITY CLAIM

This application is based upon and claims the right of priority under 35 U.S.C. § 371 to International Application No. PCT/US2019/067348 filed on Dec. 19, 2019, which is incorporated by reference herein.

FIELD

The present disclosure relates generally to navigation and in particular to a system for route generation that can include the use of constraints associated with the availability of various resources or services in a geographic area.

BACKGROUND

Operations associated with the state of a geographic area can be implemented on a variety of computing devices. These operations can include processing data associated with the geographic area for later access and use by a user or computing system. Further, the operations can include exchanging data with remote computing systems. However, the types of operations that are performed and the way in which the operations are performed can vary over time, as can the underlying hardware that implements the operations. Accordingly, there are different ways to leverage computing resources associated with the state of a geographic area.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of navigation. The computer-implemented method can include accessing, by a computing system including one or more processors, travel data including information associated with a starting location and a destination. Further, the computer-implemented method can include determining, by the computing system, one or more routes from the starting location to the destination. Each of the one or more routes can be associated with one or more regions. The computer-implemented method can include determining, by the computing system, one or more travel costs respectively associated with travelling from the starting location to the destination via each of the one or more routes. The computer-implemented method can include determining, by the computing system, one or more convenience costs respectively associated with an availability of one or more facilities within the one or more regions associated with each of the one or more routes. The computer-implemented method can include selecting, by the computing system, based at least in part on the one or more travel costs, the one or more convenience costs, and one or more travel criteria, a travel route from the one or more routes. The one or more travel criteria can be associated with travel preferences. Furthermore, the computer-implemented method can include generating, by the computing system, route data including information associated with one or more indications based at least in part on the travel route.

Another example aspect of the present disclosure is directed to one or more tangible non-transitory computer-readable media storing computer-readable instructions that when executed by one or more processors cause the one or more processors to perform operations. The operations can include accessing travel data including information associated with a starting location and a destination. Further, the operations can include determining one or more routes from the starting location to the destination. Each of the one or more routes can be associated with one or more regions. The operations can include determining one or more travel costs respectively associated with travelling from the starting location to the destination via each of the one or more routes. The operations can include determining one or more convenience costs respectively associated with an availability of one or more facilities within the one or more regions associated with each of the one or more routes. The operations can include selecting, based at least in part on the one or more travel costs, the one or more convenience costs, and one or more travel criteria, a travel route from the one or more routes. The one or more travel criteria can be associated with travel preferences. Furthermore, the operations can include generating route data including information associated with one or more indications based at least in part on the travel route.

Another example aspect of the present disclosure is directed to a computing system that can include: one or more processors; and one or more tangible non-transitory computer-readable media storing instructions that when executed by the one or more processors cause the one or more processors to perform operations. The operations can include accessing travel data including information associated with a starting location and a destination. Further, the operations can include determining one or more routes from the starting location to the destination. Each of the one or more routes can be associated with one or more regions. The operations can include determining one or more travel costs respectively associated with travelling from the starting location to the destination via each of the one or more routes. The operations can include determining one or more convenience costs respectively associated with an availability of one or more facilities within the one or more regions associated with each of the one or more routes. The operations can include selecting, based at least in part on the one or more travel costs, the one or more convenience costs, and one or more travel criteria, a travel route from the one or more routes. The one or more travel criteria can be associated with travel preferences. Furthermore, the operations can include generating route data including information associated with one or more indications based at least in part on the travel route.

Other example aspects of the present disclosure are directed to other methods, systems, devices, apparatuses, or tangible non-transitory computer-readable media for navigation.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
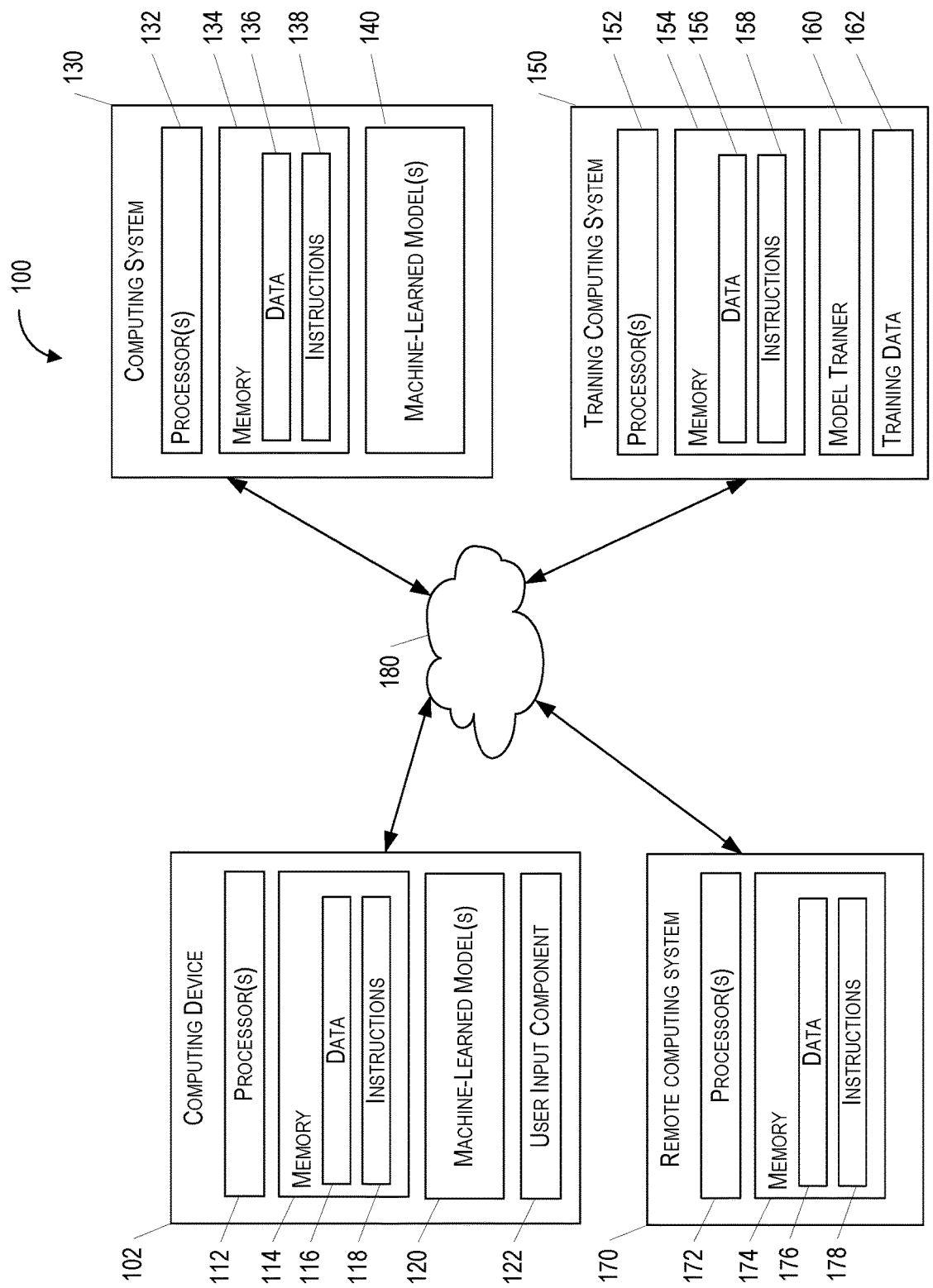
FIG. 1 depicts a diagram of an example system according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to a navigation system that can be used to plan travel routes partly on the basis of a set of criteria associated with travel costs and the convenience of travel. In particular, the disclosed technology can be used to generate a travel route to a destination using travel constraints that are partly based on the location and availability of various facilities, resources, and/or services along the route. For example, a route can be planned for a passenger of a vehicle so that the route stays within some predetermined distance of refueling facilities. Further, the generated routes can be based in part on a user's travel preferences with respect to the type of facilities the user prioritizes and the proximity of those facilities along a route planned for the user. As such, the disclosed technology can ensure that a user will travel in safety and comfort without spending an excessive amount of time or fuel. Further, by planning a route that stays within some predetermined distance of a certain type of facility, the navigational path of a vehicle may be optimized with respect to that type of facility.

By way of further example, by planning a route that stays within some predetermined distance from refueling facilities, a vehicle may be able to complete a trip between two destinations that it may not otherwise have been able to complete if low on fuel, for example if the vehicle had taken a different route that deviated too far from refueling facilities. In some examples the route may be output to a user, for example via a display of the navigation system. Further, the route may be used to control the navigation of a vehicle, such as an autonomous vehicle, for example, by causing the vehicle to navigate along the route. Example aspects of the present disclosure may allow a navigation system to interact more reliably and effectively with a physical environment The disclosed technology can be implemented in a computing system (e.g., a navigation computing system) that is configured to access data, perform operations on the data (e.g., route determination, travel cost determination, and/or convenience cost determination), and generate output including route indications. Further, the computing system can be included in a vehicle (e.g., an in-vehicle navigation system) or as part of a system that includes a navigation server that receives travel data (e.g., a current location and desired destination) from a client device (e.g., a smart phone) performs operations based on the travel data and sends output including route data (e.g., a planned route) back to the client device, which can be configured to perform further operations on the route data.

By way of example, the disclosed technology can use the current location of a user (e.g., a user associated with a navigation device which can include a smartphone or an in-vehicle navigation system) to determine an initial set of routes to a destination. Travel costs associated with travelling the route (e.g., the total distance or estimated time to travel a route) can be determined for each of the initial routes. Further, a convenience cost associated with the availability of facilities (e.g., refueling stations, restaurants, recreation areas) along each initial route can be determined. Then based on the travel costs, the convenience costs, and travel criteria (e.g., criteria associated with the prioritization of certain types of facilities to a user), a travel route can be selected. The selected travel route can then be provided to a user in the form of notifications such as visual or auditory directions to the destination. Furthermore, the travel route can be included as part of route data that can be used by other devices or systems including vehicle systems. In this way, the disclosed technology can improve the routes that are planned and provided to a user.

Accordingly, the disclosed technology can increase navigational safety by providing a user with a route that can be constrained based on the availability of facilities including refueling facilities, food, and other necessities along the route. Further, the disclosed technology can assist a user in more effectively performing the technical task of generating constrained routes to facilitate navigation from one location to another by means of a continued and/or guided human-machine interaction process.

The navigation computing system can access data which can include travel data. The travel data can include information associated with a starting location and a destination. For example, the travel data can include a latitude, longitude, and/or altitude associated with each of the starting location and the destination respectively. Further, the travel data can include information associated with one or more maps of a geographic area (e.g., a geographic area that can be divided into one or more regions) including the starting location and/or the destination. The travel data can include the location of one or more roads (e.g., streets, highways, foot paths), bodies of water (lakes, ponds), waterways (rivers, canals), buildings including facilities (e.g., refueling facilities), bridges, tunnels, overpasses, and/or underpasses. Further, the location data can also include information associated with traffic regulations (e.g., speed limits in a region) and/or traffic flow patterns (e.g., the direction and/or amount of vehicular traffic in a region). As used herein, the terms "facility" can include a resource and/or a service. Further, the term "facilities" can include resources and/or services. For example, a refueling resource can be associated with battery charging resources and/or fuel resources. Further, in some embodiments, the refueling resource can be associated with a refueling facility. By way of further example, a refueling service can be associated with provision of services associated with recharging a battery of a vehicle and/or refueling a fuel tank of a vehicle. Further, in some embodiments, the refueling service can be associated with a refueling facility.

The navigation computing system can determine one or more routes from the starting location to the destination. Further, each of the one or more routes can be associated with one or more regions. For example, one or more routes between the starting location and the destination can be determined by accessing the travel data and determining a set of roads between the starting location and the destination. Further, the navigation computing system can access travel data that includes information associated with the geographic area including the one or more routes in which the geographic region is divided into one or more regions associated with a type of facility (e.g., an eating establishment). In some embodiments, the one or more routes can be associated with one or more different sets of regions that are respectively associated with a different type of facility (e.g., one set of regions associated with refueling facilities and another set of regions associated with eating establishments).

In some embodiments, the one or more routes can be based at least in part on one or more route constraints that constrain a number or amount of the one or more routes. Further, the one or more route constraints can include a threshold route distance, a threshold route travel time, and/or a minimum distance to a refueling facility from any location along the one or more routes. The threshold distance can include a maximum route distance based at least in part on a distance between the starting location and the destination. For example, the navigation system can constrain the one or more routes based at least in part on a maximum route distance that is some multiple of a minimum distance between the starting location and the destination (e.g., the maximum route distance for a route is constrained to no more than twice the minimum distance from the starting location to the destination).

The threshold route travel time can include a maximum travel time based at least in part on an estimated travel time between the starting location and the destination. For example, the navigation system can constrain the one or more routes based at least in part on a maximum travel time that is some multiple of a minimum estimated travel time between the starting location and the destination (e.g., the maximum travel time for a route is constrained to no more than fifty percent (50%) longer duration than the minimum estimated travel time between the starting location and the destination).

Furthermore, the one or more regions can correspond to one or more cells of a Voronoi diagram that is based at least in part on a geographic area that can include the starting location and the destination. Further, each of the one or more cells (or plurality of cells) of the Voronoi diagram can be based at least in part on one or more locations of the one or more facilities in the geographic area. For example, the locations of one or more facilities of a particular type (e.g., refueling facilities) in a geographic area can be determined. Voronoi cells of a Voronoi graph for the geographic area can then be generated based on, for example, a Euclidean distance, a Mahalanobis distance, or Manhattan distance of the one or more facilities with respect to nearby facilities.

In some embodiments, each of the one or more cells (or plurality of cells) of the Voronoi diagram can be associated with a plurality of different types of the one or more facilities. By way of example, a plurality of Voronoi diagrams can be generated for a respective plurality of different types of facilities (e.g., a Voronoi diagram for a first type of facility and a Voronoi diagram for a second type of facility). A joint Voronoi diagram including an intersection of the Plurality of Voronoi diagrams can be determined and/or generated (e.g., an overlay of the plurality of Voronoi diagrams, one Voronoi diagram intersecting the other). Further, each of the plurality of cells in the joint Voronoi diagram can include at least one of each of the plurality of different types of facilities (e.g., each cell of the plurality of cells can include the first type of facility and the second type of facility). As described herein, the intersection of the plurality of Voronoi diagrams can include an overlay of two or more Voronoi diagrams associated with the same geographic area (e.g., facilities at a location in a first Voronoi diagram will overlay facilities at the same location in a second Voronoi diagram).

The navigation computing system can determine one or more travel costs. The one or more travel costs can be respectively associated with (a cost of) travelling from the starting location to the destination via each of the one or more routes. The one or more travel costs can be based at least in part on a set of travel cost parameters (e.g., distance of route and/or estimated time to travel a route) and corresponding travel cost values (e.g., the distance in kilometers of each respective route and/or the estimated time in minutes to travel each route) that are associated with various aspects of the one or more routes. For example, the one or more travel costs can be associated with the distance of each route such that route distance is positively correlated with travel cost (greater route distance is associated with greater travel cost). By way of further example, the one or more travel costs can be associated with an estimated time to travel each route such that estimated travel time is positively correlated with travel cost (greater estimated travel time is associated with greater travel cost).

In some embodiments, the one or more travel costs can be based at least in part on an estimated distance and/or an estimated travel time associated with each of the one or more routes. For example, the navigation computing system can determine the estimated distance and/or estimated travel time associated with each of the one or more routes based at least in part on accessing the travel data and/or other data that provides map or navigation information. Further, the navigation computing system can determine that the one or more travel costs are inversely correlated with the estimated distance and/or estimated travel time associated with each respective route. For example, all other things being equal, the travel cost of a route with a distance of ten (10) kilometers will be lower than the travel cost of a route with a distance of twenty (20) kilometers.

The navigation computing system can determine one or more convenience costs. The one or more convenience costs can be respectively associated with an availability of one or more facilities within the one or more regions associated with each of the one or more routes. In some embodiments, the one or more convenience costs can be associated with the number or proximity of a specific type of facility (e.g., a refueling facility) in each of the regions associated with each respective route. Further, the one or more convenience costs can be inversely correlated with the number or proximity of facilities in each of the regions (e.g., more facilities and/or facilities that are closer to a route can be associated with a lower convenience cost).

In some embodiments, the one or more convenience costs can be based at least in part on a number of the one or more facilities within each of the one or more regions (e.g., a greater number of facilities in a region can be inversely correlated with convenience cost), a distance of each of the one or more facilities from the one or more routes (e.g., the distance of a facility away from a route can be positively correlated with convenience cost), and/or a number of different types of the one or more facilities within each of the one or more regions (e.g., more different types of facilities in a region can be inversely correlated with convenience cost).

In some embodiments, the one or more facilities can include one or more refueling stations (e.g., gas stations and/or electrical vehicle recharging stations), one or more eating establishments (e.g., restaurants, grocery stores, and/or beverage dispensaries), one or more lavatories, and/or one or more recreation areas (e.g., playgrounds and/or entertainment areas).

In some embodiments, the one or more facilities can be identified based at least in part on use of image content analysis performed by one or more machine-learned models. For example, data and/or information associated with one or more images (e.g., satellite images and/or geotagged street-level images) and/or maps of a geographic area can be provided as an input to one or more machine-learned models that are configured and/or trained to detect, identify, and/or recognize one or more facilities depicted in the images. Further, the one or more machine-learned models can then label facilities identified in the images (e.g., label a refueling station) and associate the labelled facilities with information including the location (e.g., latitude, longitude, and altitude) of the facility.

The navigation computing system can select and/or determine a travel route from the one or more routes. The travel route can be selected and/or determined based at least in part on the one or more travel costs, the one or more convenience costs, and/or one or more travel criteria. Further, the one or more travel criteria can be associated with travel preferences (e.g., travel preferences of a user including the highest priority facilities that the user would like to have available along a route).

In some embodiments, the travel route can be based at least in part on minimization of some combination of the one or more travel costs and/or the one or more convenience costs. For example, the travel route can be the route of the one or more routes that is associated with a combination (e.g., a weighted combination) of the one or more travel costs and the one or more convenience costs that are lowest.

In some embodiments, the one or more travel criteria can be based at least in part on one or more preferences associated with the one or more travel costs or the one or more convenience costs. For example, the one or more travel criteria can be based at least in part on a weighting in which the travel costs are more heavily weighted (e.g., an eighty percent weighting assigned to the one or more travel costs) than the one or more convenience costs (e.g., a twenty percent weighting assigned to the one or more convenience costs). As such, a shorter distance or travel time for a route can be more heavily weighted than the number of facilities or user facility preferences along the route.

In some embodiments, the one or more travel criteria can be based at least in part on a determination of one or more user preferences. For example, the a user can provide data indicating the user's particular facility priorities (e.g., proximity of refueling facilities to a route is of the highest priority). Further, a weighting of the one or more preferences can be adjusted based at least in part on the one or more user preferences. For example, a user preference can indicate that reduced travel time is the highest priority with a one-hundred percent (100%) weighting such that the one or more travel costs can be determinative of the travel route (e.g., the route with the shortest distance or the lowest estimated travel time is the travel route).

In some embodiments, the one or more preferences associated with the one or more travel costs can be based at least in part on a maximum travel time (e.g., or a maximum travel distance associated with the one or more routes).

In some embodiments, the one or more preferences associated with the one or more convenience costs can be based at least in part on an importance of each type of the one or more facilities. Further, each of the one or more facilities can be prioritized based at least in part on a respective importance associated with a facility type of each of the one or more facilities. For example, the one or more facilities associated with a refueling facility type can be of the highest priority and have a higher priority than other facilities (e.g., recreation areas). Further, the types of the one or more facilities with a higher priority can be weighted more heavily than lower priority facilities.

In some embodiments, satisfying the one or more travel criteria can include a route of the one or more routes having one or more road segments that are contiguous between the starting location and the destination. For example, satisfying the one or more travel criteria can include the route having drivable road at all segments of the route from the starting location to the destination.

In some embodiments, satisfying the one or more travel criteria can include the one or more facilities being within a predetermined distance of the one or more routes and/or a type of the one or more facilities being within a predetermined distance of the one or more routes. For example, the one or more travel criteria can constrain the one or more routes based on the routes that have at least one facility within a predetermined distance of the respective route (e.g., one or more facilities are within one kilometer of a route) at all locations along the route. By way of further example, the one or more travel criteria can constrain the one or more routes based on the routes that have at least one facility of a particular type (e.g., refueling facility) within a predetermined distance of the respective route (e.g., some type of facility is within five hundred meters of a route) at all locations along the route.

The navigation computing system can generate route data. The route data can include one or more indications based at least in part on the travel route. In some embodiments, the route data include one or more indications associated with directions to follow the travel route. For example, the one or more indications can include one or more visual indications (e.g., a map of the geographic area including a highlighted route between the starting location and the destination) and/or one or more audible indications (e.g., audible instructions indicating the location of facilities along the travel route).

Furthermore, the navigation computing system can determine one or more alternative travel routes. The one or more alternative routes can be based at least in part on the one or more travel costs, the one or more convenience costs, and/or the one or more travel criteria. The one or more alternative travel routes can include the one or more routes that satisfy the one or more travel criteria and have a lowest combination of the one or more travel costs or the one or more convenience costs. For example, when the one or more travel criteria include a route not being further than ten (10) kilometers away from a refueling facility, the one or more alternative routes can include the one or more routes that are not further than ten (10) kilometers away from one or more refueling facilities that have the next lowest (after the selected travel route) combination of the one or more travel costs and/or the one or more convenience costs.

Further, the navigation computing system can generate one or more indications associated with the one or more alternative routes. For example, the one or more indications can include a graphical display including a map of a geographic area including the starting location and the destination, with the travel route identified as the travel route and superimposed on the map in green highlight and two alternative routes identified as alternative routes and superimposed on the map in yellow.

The navigation computing system can determine the location of a device associated with the travel route. For example, the navigation computing system can receive one or more signals from a navigation satellite system and use the signal to determine the latitude, longitude, and/or altitude of the device. The device can, for example, include a vehicle (e.g., a motor vehicle) and/or a navigation device (e.g., a smart phone and/or a dedicated navigation device).

Further, the navigation computing system can generate the one or more indications when a distance between the device and the travel route exceeds a threshold distance. For example, the navigation computing system can determine that the distance of a navigation device (e.g., a smart phone) carried by a hiker in a park is more than the threshold distance of one hundred meters away from the travel route. Based on the threshold distance being exceeded, the navigation computing system can generate an audible indication (e.g., warning beeps) to notify the hiker that he is too far away from the travel route (e.g., too far from the one or more facilities that the travel route optimizes the distance based at least in part on a set of constraints including the maximum distance to the nearest facility).

In some embodiments, the navigation computing system can control one or more vehicle systems of a vehicle based at least in part on the route data. The one or more vehicle systems can include one or more motor systems, one or more steering systems, one or more notification systems, and/or one or more braking systems. For example, the navigation system can be implemented as part of an in-vehicle navigation system of a vehicle (e.g., a motor vehicle) and can control notification systems in the vehicle that generate audible indications that inform passengers of the vehicle of the facilities that are closest to the current location of the vehicle as the vehicle travels to its destination.

The disclosed technology can include a computing system (e.g., the navigation computing system) that is configured to perform various operations associated with generating routes. In some embodiments, the navigation computing system can be associated with various computing systems and/or devices that use, send, receive, and/or generate routes and/or indications associated with travel routes. Furthermore, the navigation computing system can process, generate, modify, and/or access (e.g., send, and/or receive) data and/or information including data and/or information associated with generated routes including maps of one or more geographic regions through which the routes will pass.

The navigation computing system can include specialized hardware and/or software that enable the performance of one or more operations specific to the disclosed technology. The navigation computing system can include one or more application specific integrated circuits that are configured to perform operations associated with determining routes to a destination, determining travel costs, determining convenience costs, and selecting a route for a user based on the travel costs and convenience costs.

By way of example, the navigation computing system can be configured to control one or more vehicle systems of a vehicle based at least in part on one or more portions of route data. The one or more vehicle systems can include notification systems and/or vehicle information systems that are used to provide information (e.g., map or navigation information) to a passenger of the vehicle. For example, the navigation computing system can provide a map of a geographic area including indications showing one or more routes through the area.

Additionally, the navigation computing system can be configured to generate data used to implement one or more indications associated with the route data. The one or more indications can include one or more visual indications and/or one or more auditory indications associated with the route data. For example, a vehicle computing system can generate one or more auditory indications including an auditory message when a facility (e.g., a refueling facility) is nearby.

The systems, methods, devices, apparatuses, and tangible non-transitory computer-readable media in the disclosed technology can provide a variety of technical effects and benefits including an improvement in route planning. In particular, the disclosed technology may assist a user (e.g. a user of a navigation device) in performing technical tasks by means of a continued and/or guided human-machine interaction process in which a travel route is provided to a user, based in part on the user's indicated preferences, and in which indications of nearby facilities are provided as the user traverses the route. The indications to the user can be based at least in part on continuous or periodic exchange of signals (e.g., GPS signals) and/or data associated with the tracked position of the user or an associated device. Furthermore, the disclosed technology may also provide additional benefits including improvements in device uptime, better resource usage efficiency, a reduction in environmental impact, and improved safety.

The disclosed technology can improve the uptime of a navigation device by more effectively generating routes that pass through areas with sufficient network access (e.g., increase network access can be associated with greater convenience for a user) and/or energy to charge the navigation device. By ensuring that routes are within range of network connections or power sources, the navigation device can stay connected to a network or remain within reach of a recharging facility.

Furthermore, the disclosed technology can improve the efficiency of resource consumption (e.g., fuel and electrical energy) by generating routes that allow a user to refuel along the way to their destination without having to take lengthy detours from the planned route. Further, the proximity of other facilities (e.g., restaurants and other amenities) to a route can further reduce the amount of fuel that is used to travel to those other facilities. For example, closer proximity to facilities such as refueling facilities can reduce the amount of energy (e.g., fuel and/or electric energy) associated with diverting course to refuel an internal combustion engine vehicle or recharge a vehicle battery.

Additionally, the disclosed technology can be used to generate routes that improve user safety by ensuring that routes do not pass through areas with a lack of facilities that improve safety. For example, routes for a user on foot could be generated so that a hiker does not stray too far from areas with fresh water. Further, the disclosed technology can constrain travel routes to those that include medical facilities or facilities that accommodate the less able bodied.

The disclosed technology can also be used to reduce the environmental impact (e.g., adverse environmental impact) on a region by minimizing one or more travel costs associated with travelling from one location to another (e.g., from a starting location to a destination). For example, a travel cost can be associated with the amount of vehicle exhaust (and thereby the amount of air pollution) associated with travelling along a travel route (e.g., greater travel distance and/or travel time can be associated with a greater amount of vehicle exhaust). The disclosed technology can be used to reduce the amount of pollution that is associated with travel.

As such, the disclosed technology may assist the user of a navigation device in more effectively performing a variety of tasks with the specific benefits of improved device uptime, reduced resource consumption, reduced environmental impact, and improved safety. Further, any of the specific benefits provided to users can be used to improve the effectiveness of a wide variety of devices and services including navigation devices and/or navigation services that provide navigational routes. Accordingly, the improvements offered by the disclosed technology can result in tangible benefits to a variety of devices and/or systems including mechanical, electronic, and computing systems associated with navigation and/or providing routes for use in navigation.

With reference now to FIGS. 1-9, example embodiments of the present disclosure will be discussed in further detail. FIG. 1 depicts a diagram of an example system according to example embodiments of the present disclosure. The system 100 includes a computing device 102, a computing system 130, a training computing system 150, and one or more remote computing systems 170 that are communicatively connected and/or coupled over a network 180.

The computing device 102 can include one or more processors 112 and a memory 114. The one or more processors 112 can include any suitable processing device (e.g., a processor core, a microprocessor, an application specific integrated circuit (ASIC), a field programmable gate array (FPGA), a controller, and/or a microcontroller) and can be one processor or a plurality of processors that are operatively connected. The memory 114 can include one or more non-transitory computer-readable storage mediums, including RAM, NVRAM, ROM, EEPROM, EPROM, flash memory devices, magnetic disks, and combinations thereof. The memory 114 can store data 116 and instructions 118 which are executed by the processor 112 to cause the computing device 102 to perform one or more operations. In some embodiments, the data 116 can include: travel data that can include information associated with a starting location and a destination within a geographic region and/or route data that can include information associated with a travel route. In some embodiments, the computing device 102 can include any of the attributes and/or capabilities of the computing system 130 and can perform one or more operations including any of the operations performed by the computing system 130.

The computing device 102 can be implemented in and/or include any type of computing device, including, for example, a navigation device (e.g., a computing device configured to perform any operations described herein including one or more operations associated with navigation and/or using travel data and/or route data), a personal computing device (e.g., laptop computing device or desktop computing device), a mobile computing device (e.g., smartphone or tablet), a controller, a wearable computing device (e.g., a smart watch), and/or an embedded computing device.

Further, the computing device 102 can be configured to perform one or more operations including: accessing travel data including information associated with a starting location and a destination; determining one or more routes from the starting location to the destination; determining one or more travel costs respectively associated with travelling from the starting location to the destination via each of the one or more routes; determining one or more convenience costs respectively associated with an availability of one or more facilities within the one or more regions associated with each of the one or more routes; selecting, based at least in part on the one or more travel costs, the one or more convenience costs, and one or more travel criteria, a travel route from the one or more routes; and/or generating route data including information associated with one or more indications based at least in part on the travel route.

In some embodiments, the computing device 102 can perform one or more operations including: determining the one or more travel criteria based at least in part on one or more user preferences; and adjusting a weighting of the one or more preferences based at least in part on the one or more user preferences. Further, the computing device 102 can perform one or more operations including: determining, based at least in part on the one or more travel costs, the one or more convenience costs, or the one or more travel criteria, one or more alternative travel routes from the one or more routes; and generating the route data comprising information associated with one or more alternative indications associated with the one or more alternative routes. Furthermore, the computing device 102 can perform one or more operations including: determining the location of a device associated with the travel route; and generating the one or more indications when a distance between the device and the travel route exceeds a threshold distance.

In some implementations, the computing device 102 can implement and/or include one or more machine-learned models 120. For example, the one or more machine-learned models 120 can include various machine-learned models including neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks, and/or other forms of neural networks. Examples of the one or more machine-learned models 120 are discussed with reference to FIGS. 1-9.

In some implementations, the one or more machine-learned models 120 can be received from the computing system 130 (e.g., a server computing system) over network 180, stored in the computing device memory 114, and then used or otherwise implemented by the one or more processors 112. In some implementations, the computing device 102 can implement multiple parallel instances of a single machine-learned model of the one or more machine learned models 120 (e.g., to determine one or more routes, one or more travel costs, and/or one or more convenience costs across multiple instances of the machine-learned model 120). More particularly, the one or more machine-learned models 120 can be configured and/or trained to perform any of the operations performed by the computing system 130.

Additionally, or alternatively, one or more machine-learned models 140 can be included in or otherwise stored and implemented by the computing system 130 that communicates with the computing device 102, for example, according to a client-server relationship. For example, the machine-learned models 140 can be implemented by the computing system 130 as a portion of a web service (e.g., a navigation and/or route provision service). Thus, one or more machine-learned models 120 can be stored and implemented at the computing device 102 and/or one or more machine-learned models 140 can be stored and implemented at the computing system 130.

The computing device 102 can also include one or more of the user input component 122 that can receive user input. For example, the user input component 122 can be a touch-sensitive component (e.g., a touch-sensitive display screen or a touch pad) that is sensitive to the touch of a user input (e.g., a finger and/or a stylus). The touch-sensitive component can serve to implement a virtual keyboard. Other example user input components include a microphone, a mechanical keyboard, an electromechanical keyboard, and/or other means by which a user can provide user input.

The computing system 130 can include one or more processors 132 and a memory 134. The one or more processors 132 can include any suitable processing device (e.g., a processor core, a microprocessor, an ASIC, a FPGA, a controller, and/or a microcontroller) and can include one processor or a plurality of processors that are operatively connected. The memory 134 can include one or more non-transitory computer-readable storage mediums, including RAM, ROM, EEPROM, EPROM, flash memory devices, magnetic disks, and combinations thereof. The memory 134 can store data 136 and instructions 138 which are executed by the processor 132 to cause the computing system 130 to perform operations. In some embodiments, the data 136 can include: travel data and/or route data.

Furthermore, in some embodiments, the computing system 130 can be configured to perform the operations of a server computing device including sending and/or receiving data including travel data, data associated with one or more travel costs, data associated with one or more convenience costs, and/or route data to and/or from one or more computing devices and/or computing systems including the computing device 102, the training computing system 150, and/or the remote computing system 170. In some embodiments, the computing system 130 can include any of the attributes and/or capabilities of the computing device 102 and can perform one or more operations including any of the operations performed by the computing device 102.

Further, the computing system 130 can be implemented in and/or include any type of computing system, including, for example, a navigation computing system (e.g., a computing system configured to perform any operations described herein including one or more operations associated with generating or accessing travel data; determining one or more routes; and/or generating or accessing route data), a personal computing device (e.g., laptop computing device or desktop computing device), a mobile computing device (e.g., smartphone or tablet), a server computing system (e.g., a computing system configured to provide data including travel data, route data, and/or data associated with one or more travel costs and/or one or more convenience costs), and/or a controller.

Furthermore, the server computing system 130 can be configured to perform image content analysis on one or more inputs (e.g., image data including one or more images) that are provided to the server computing system 130. For example, the server computing system 130 can receive data, via the network 180. The data can include image data that includes one or more images and/or associated metadata (e.g., the location (e.g., latitude, longitude, and/or latitude) at which the image was captured). The server computing system 130 can then perform various operations, which can include the use of the one or more machine-learned models 140, to detect one or more features of the one or more images. By way of further example, the server computing system 130 can use object recognition techniques to detect one or more objects in an image (e.g., buildings including refueling facilities, eating establishments, and/or recreation areas) and travel data based at least in part on recognition of the one or more objects. In another example, the server computing system 130 can receive data from one or more remote computing systems (e.g., the one or more remote computing systems 170) which can include images that have been associated with metadata (e.g., images with user associated metadata indicating a type of facility in an image that is generated by a user device). The data received by the server computing system 130 can then be stored (e.g., stored in an image repository) for later use by the computing system 130.

In some implementations, the computing system 130 includes and/or is otherwise implemented by one or more server computing devices. In instances in which the computing system 130 includes plural server computing devices, such server computing devices can operate according to sequential computing architectures, parallel computing architectures, or some combination thereof.

As described above, the computing system 130 can store or otherwise include the one or more machine-learned models 140. For example, the one or more machine-learned models 140 can include various machine-learned models. Example machine-learned models include neural networks or other multi-layer non-linear models. Example neural networks include feed forward neural networks, deep neural networks, recurrent neural networks, and convolutional neural networks. Examples of the one or more machine-learned models 140 are discussed with reference to FIGS. 1-9.

The computing device 102 and/or the computing system 130 can train the one or more machine-learned models 120 and/or 140 via interaction with the training computing system 150 that is communicatively connected and/or coupled over the network 180. The training computing system 150 can be separate from the computing system 130 or can be a portion of the computing system 130.

The training computing system 150 includes one or more processors 152 and a memory 154. The one or more processors 152 can be any suitable processing device (e.g., a processor core, a microprocessor, an ASIC, a FPGA, a controller, and/or a microcontroller) and can be one processor or a plurality of processors that are operatively connected. The memory 154 can include one or more non-transitory computer-readable storage mediums, including RAM, ROM, EEPROM, EPROM, flash memory devices, magnetic disks, and combinations thereof. The memory 154 can store data 156 and instructions 158 which are executed by the processor 152 to cause the training computing system 150 to perform operations. In some embodiments, the data 156 can include travel data, route data, and/or data associated with one or more travel costs and/or one or more convenience costs. In some implementations, the training computing system 150 includes or is otherwise implemented by one or more server computing devices.

The training computing system 150 can include a model trainer 160 that trains the one or more machine-learned models 120 and/or the one or more machine-learned models 140 respectively stored at the computing device 102 and/or the computing system 130 using various training or learning techniques, including, for example, backwards propagation of errors. In some implementations, performing backwards propagation of errors can include performing truncated backpropagation through time. The model trainer 160 can perform a number of generalization techniques (e.g., weight decays and/or dropouts) to improve the generalization capability of the models being trained.

In particular, the model trainer 160 can train the one or more machine-learned models 120 and/or the one or more machine-learned models 140 based on a set of training data 162. The training data 162 can include, for example, any travel data, route data, and/or data associated with one or more travel costs and/or one or more convenience costs. For example, the training data can include the locations of one or more facilities (e.g., latitude, longitude, and/or altitude of each of the one or more facilities). The one or more machine-learned models 120 and/or the one or more machine-learned models 140 can be configured and/or trained to perform any of the one or more operations performed by the computing device 102 and/or the computing system 130. For example, the one or more machine-learned models 120 can be configured and/or trained to perform various operations including: accessing travel data including information associated with a starting location and a destination; determining one or more routes from the starting location to the destination; determining one or more travel costs respectively associated with travelling from the starting location to the destination via each of the one or more routes; determining one or more convenience costs respectively associated with an availability of one or more facilities within the one or more regions associated with each of the one or more routes; selecting, based at least in part on the one or more travel costs, the one or more convenience costs, and one or more travel criteria, a travel route from the one or more routes; and/or generating route data including information associated with one or more indications based at least in part on the travel route.

In some implementations, if the user has provided consent, the training examples can be provided by the computing device 102. Thus, in such implementations, the one or more machine-learned models 120 provided to the computing device 102 can be trained by the training computing system 150 based at least in part on user-specific data received from the computing device 102 including: ranked user preferences; previously determined routes between starting locations and destinations; previously determined regions associated with routes; and/or one or more locations of facilities including the associated latitudes, longitudes, and/or altitudes of the respective facilities.

The model trainer 160 can include computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium including RAM hard disk or optical or magnetic media.

Each of the one or more remote computing systems 170 can include one or more processors 172 and a memory 174. The one or more processors 172 can include any suitable processing device (e.g., a processor core, a microprocessor, an ASIC, a FPGA, a controller, and/or a microcontroller) and can include one processor or a plurality of processors that are operatively connected. The memory 174 can include one or more non-transitory computer-readable storage mediums, including RAM, ROM, EEPROM, EPROM, flash memory devices, magnetic disks, and combinations thereof. The memory 174 can store data 176 and instructions 178 which are executed by the processor 172 to cause the remote computing system 170 to perform operations.

In some implementations, the one or more remote computing systems 170 include or are otherwise implemented by one or more computing devices. In instances in which the one or more remote computing systems 170 includes plural computing devices, such computing devices can operate according to sequential computing architectures, parallel computing architectures, and/or some combination thereof. Furthermore, the one or more remote computing systems 170 can be used to collect, generate, send, and or receive one or more signals and/or data including travel data, route data, and/or data associated with one or more travel costs and/or one or more convenience costs. The one or more remote computing systems 170 can include a smart phone device that a user of the smart phone device can use to access travel data and/or route data.

For example, the user of the smartphone device can record travel data and/or route data including the latitude, longitude, and/or altitude of one or more locations through which the user travels. The travel data and/or route data can include information associated with one or more locations which can further be associated with one or more facilities (e.g., the type of location) at each of the one or more locations respectively. Further, the one or more locations travelled by the smart phone device can be used to provide information on previous travel routes that were taken that can be used to determine one or more routes in the future. The information from the smart phone device can then be sent to the one or more remote computing systems 170 which can include a repository that can be used to store network data including user provided location and facility type information. In some embodiments, the user provided data can be strongly encrypted, anonymized (e.g., any personal information or other information associated with the user's identity is either not collected or is deleted after being received), and maintained in a secure and privacy enhancing way for use by the one or more remote computing systems 170 which can provide the travel data and/or route data for use by other computing devices and/or systems including those described herein.

The network 180 can include any type of communications network, including a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1 illustrates an example computing system that can be used to implement the present disclosure. Other computing systems can be used as well. For example, in some implementations, the computing device 102 and/or the computing system 130 can include the model trainer 160 and the training data 162. In such implementations, the one or more machine-learned models 120 can be both trained and used locally at the computing device 102 and/or the computing system 130. In some such implementations, the computing device 102 and/or the computing system 130 can implement the model trainer 160 to personalize the one or more machine-learned models 120 based on user-specific data.

Figure 2:
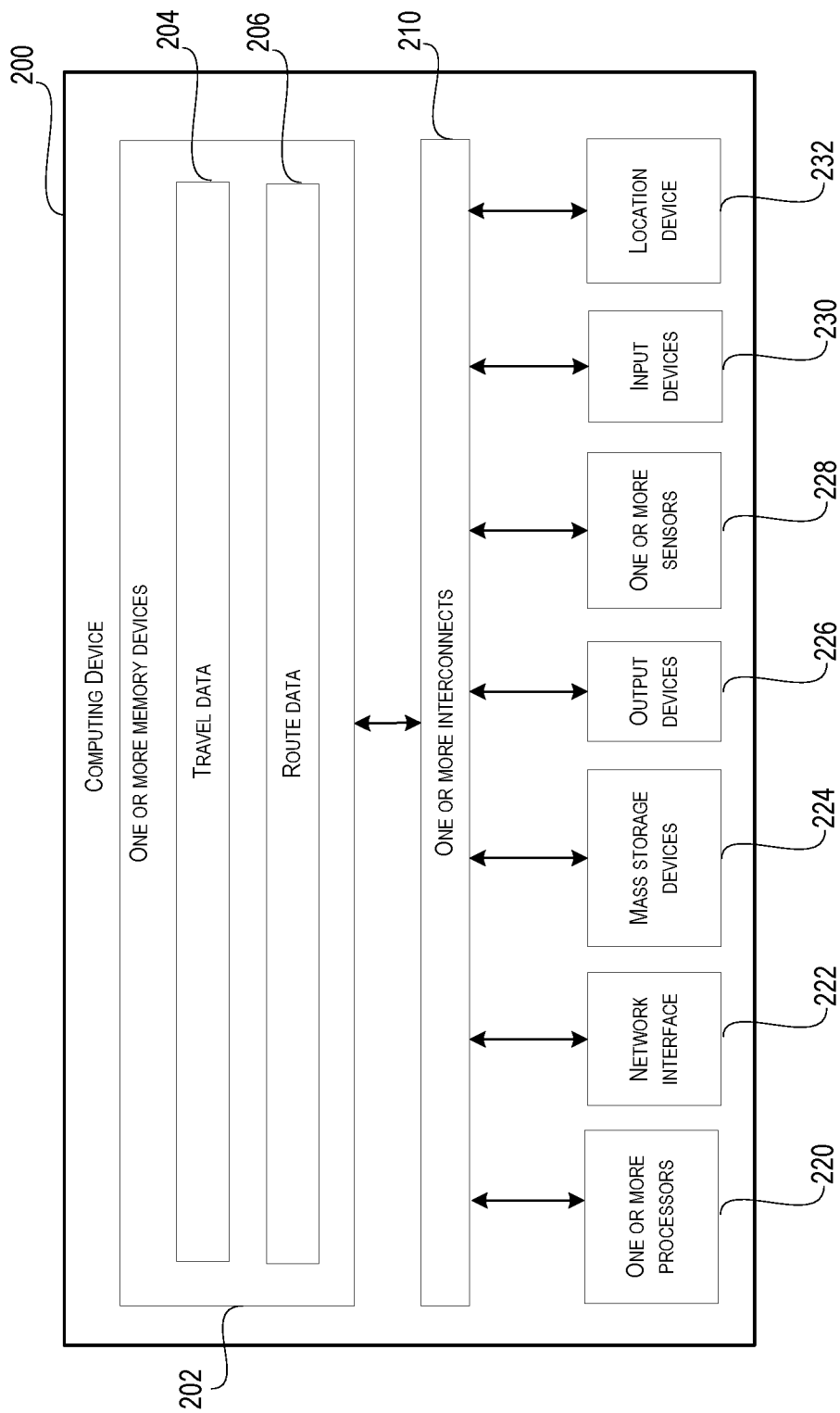
FIG. 2 depicts a diagram of an example device according to example embodiments of the present disclosure.

FIG. 2 depicts a diagram of an example device according to example embodiments of the present disclosure. A computing device 200 can include one or more attributes and/or capabilities of the computing device 102, the computing system 130, the training computing system 150, and/or the one or more remote computing systems 170. Furthermore, the computing device 200 can perform one or more actions and/or operations including the one or more actions and/or operations performed by the computing device 102, the computing system 130, the training computing system 150, and/or the one or more remote computing systems 170, which are depicted in FIG. 1.

As shown in FIG. 2, the computing device 200 can include one or more memory devices 202, travel data 204, route data 206, one or more interconnects 210, one or more processors 220, a network interface 222, one or more mass storage devices 224, one or more output devices 226, one or more sensors 228, one or more input devices 230, and/or the location device 232.

The one or more memory devices 202 can store information and/or data (e.g., the travel data 204 and/or the route data 206). Further, the one or more memory devices 202 can include one or more non-transitory computer-readable storage mediums, including RAM, ROM, EEPROM, EPROM, flash memory devices, magnetic disks, and combinations thereof. The information and/or data stored by the one or more memory devices 202 can be executed by the one or more processors 220 to cause the computing device 200 to perform operations.

The travel data 204 can include one or more portions of data (e.g., the data 116, the data 136, the data 156, and/or the data 176 which are depicted in FIG. 1) and/or instructions (e.g., the instructions 118, the instructions 138, the instructions 158, and/or the instructions 178 which are depicted in FIG. 1) that are stored in the memory 114, the memory 134, the memory 154, and/or the memory 174 respectively. Furthermore, the travel data 204 can include information associated with one or more locations including a starting location and a destination; and/or one or more regions (e.g., one or more geographic regions) that can be associated with one or more routes. In some embodiments, the travel data 204 can be received from one or more computing systems (e.g., the computing system 130 that is depicted in FIG. 1).

The route data 206 can include one or more portions of the data 116, the data 136, the data 156, and/or the data 176 which are depicted in FIG. 1 and/or instructions (e.g., the instructions 118, the instructions 138, the instructions 158, and/or the instructions 178 which are depicted in FIG. 1) that are stored in the memory 114, the memory 134, the memory 154, and/or the memory 174 respectively. Furthermore, the route data 206 can include information associated with one or more routes through one or more regions. Furthermore, the route data 206 can also include information associated with one or more indications (e.g., directions associated with a travel route). In some embodiments, the route data 206 can be received from one or more computing systems (e.g., the computing system 130 that is depicted in FIG. 1).

The one or more interconnects 210 can include one or more interconnects or buses that can be used to send and/or receive one or more signals (e.g., electronic signals) and/or data (e.g., the travel data 204 and/or the route data 206) between components of the computing device 200, including the one or more memory devices 202, the one or more processors 220, the network interface 222, the one or more mass storage devices 224, the one or more output devices 226, the one or more sensors 228 (e.g., a sensor array), and/or the one or more input devices 230. The one or more interconnects 210 can be arranged or configured in different ways including as parallel or serial connections. Further the one or more interconnects 210 can include one or more internal buses to connect the internal components of the computing device 200; and one or more external buses used to connect the internal components of the computing device 200 to one or more external devices. By way of example, the one or more interconnects 210 can include different interfaces including Industry Standard Architecture (ISA), Extended ISA, Peripheral Components Interconnect (PCI), PCI Express, Serial AT Attachment (SATA), HyperTransport (HT), USB (Universal Serial Bus), Thunderbolt, IEEE 1394 interface (FireWire), and/or other interfaces that can be used to connect components.

The one or more processors 220 can include one or more computer processors that are configured to execute the one or more instructions stored in the one or more memory devices 202. For example, the one or more processors 220 can, for example, include one or more general purpose central processing units (CPUs), application specific integrated circuits (ASICs), and/or one or more graphics processing units (GPUs). Further, the one or more processors 220 can perform one or more actions and/or operations including one or more actions and/or operations associated with the travel data 204 and/or the route data 206. The one or more processors 220 can include single or multiple core devices including a microprocessor, microcontroller, integrated circuit, and/or logic device.

The network interface 222 can support network communications. For example, the network interface 222 can support communication via networks including a local area network and/or a wide area network (e.g., the Internet). The one or more mass storage devices 224 (e.g., a hard disk drive and/or a solid state drive) can be used to store data including the travel data 204 and/or the route data 206. The one or more output devices 226 can include one or more display devices (e.g., LCD display, OLED display, and/or CRT display), one or more light sources (e.g., LEDs), one or more loud speakers, and/or one or more haptic output devices.

The one or more input devices 230 can include one or more keyboards, one or more touch sensitive devices (e.g., a touch screen display), one or more buttons (e.g., ON/OFF buttons and/or YES/NO buttons), one or more microphones, and/or one or more cameras.

The one or more memory devices 202 and the one or more mass storage devices 224 are illustrated separately, however, the one or more memory devices 202 and the one or more mass storage devices 224 can be regions within the same memory module. The computing device 200 can include one or more additional processors, memory devices, network interfaces, which may be provided separately or on the same chip or board. The one or more memory devices 202 and the one or more mass storage devices 224 can include one or more computer-readable media, including, but not limited to, non-transitory computer-readable media, RAM, ROM, hard drives, flash drives, and/or other memory devices.

The one or more memory devices 202 can store sets of instructions for applications including an operating system that can be associated with various software applications or data. The one or more memory devices 202 can be used to operate various applications including a mobile operating system developed specifically for mobile devices. As such, the one or more memory devices 202 can store instructions that allow the software applications to access data including wireless network parameters (e.g., identity of the wireless network, quality of service), and invoke various services including telephony, location determination (e.g., via global positioning system (GPS) or WLAN), and/or wireless network data call origination services. In other embodiments, the one or more memory devices 202 can be used to operate or execute a general-purpose operating system that operates on both mobile and stationary devices, such as smartphones and desktop computers, for example.

The software applications that can be operated or executed by the computing device 200 can include applications associated with the system 100 shown in FIG. 1. Further, the software applications that can be operated and/or executed by the computing device 200 can include native applications and/or web-based applications.

The location device 232 can include one or more devices or circuitry for determining the position of the computing device 200. For example, the location device 232 can determine an actual and/or relative position of the computing device 200 by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or Wi-Fi hotspots, beacons, and the like and/or other suitable techniques for determining position.

Figure 3:
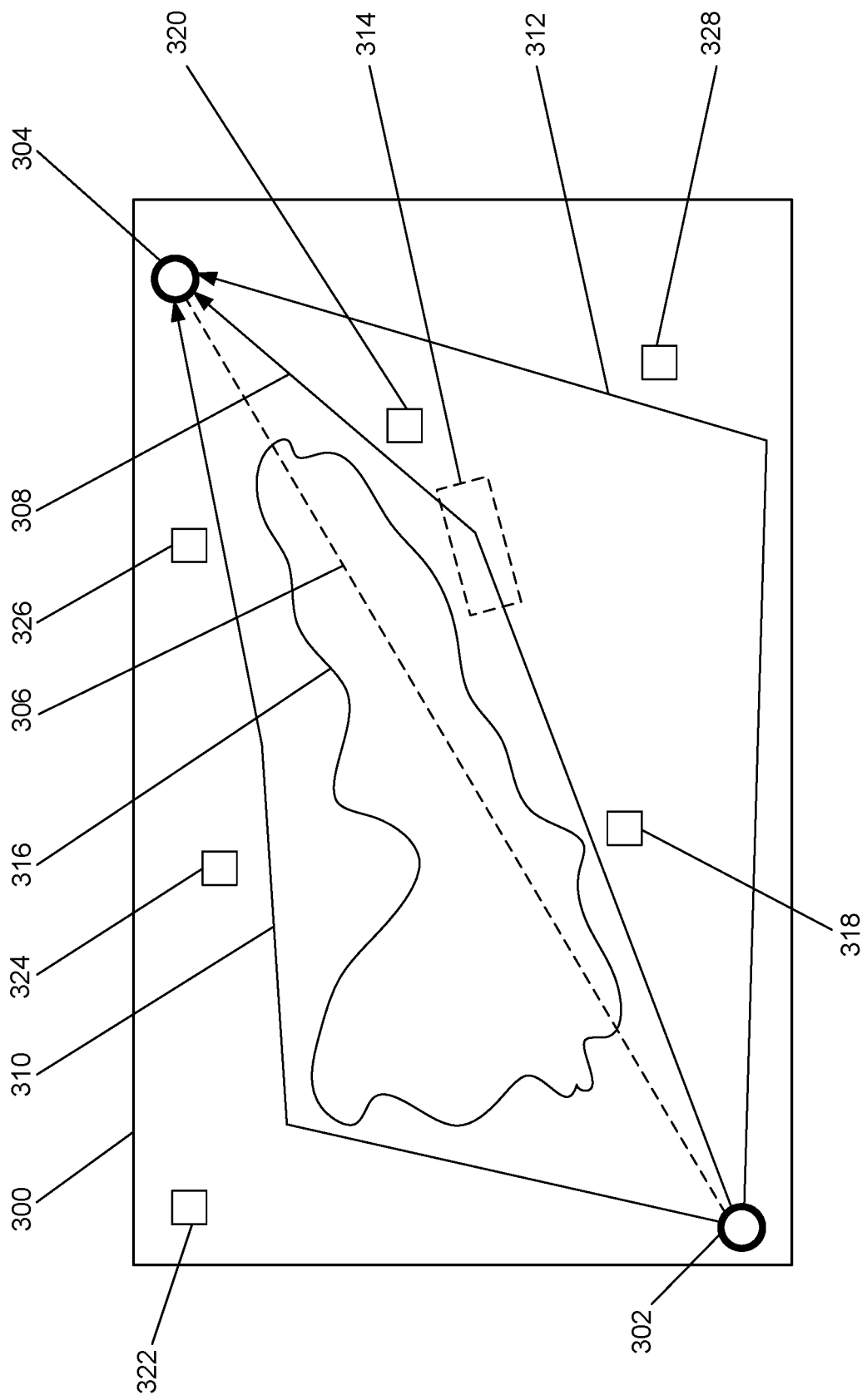
FIG. 3 depicts an example of route determination according to example embodiments of the present disclosure.

FIG. 3 depicts an example of route determination according to example embodiments of the present disclosure. Any operations and/or actions performed in an environment 300 can be performed by a computing device and/or computing system that includes one or more attributes and/or capabilities of the computing device 102, the computing system 130, the training computing system 150, and/or the one or more remote computing systems 170. As shown in FIG. 3, the environment 300 includes a starting location 302, a destination 304, a shortest distance 306, a first route 308, a second route 310, a third route 312, a construction zone 314, a lake 316, a facility 318, a facility 320, a facility 322, a facility 324, a facility 326, and a facility 328.

The environment 300 can include any geographic region or geographic area, for example a region that includes a town (e.g., the starting location 302) and a city (e.g., the destination 304) that are connected together by three roads (e.g., the route 308, the route 310, and the route 312).

The shortest distance 306 (e.g., a distance of ninety (90) kilometers) represents the shortest distance between the starting location 302 and the destination 304. In this example, a ground-based vehicle (not shown) will be used to travel between the location 302 and the destination 304. However, the lake 316 through which the shortest distance 306 passes is not navigable by the ground-based vehicle and would require a non-ground based vehicle (e.g., a boat or aircraft) to traverse. As such, the first route 308, the second route 310, and the third route 312 are the three navigable routes between the starting location 302 and the destination 304.

The first route 308 is the shortest navigable route (e.g., a distance of one-hundred (100) kilometers) between the starting location 302 and the destination location 304, the second route 310 is the second shortest navigable route (e.g., a distance of one-hundred and fifteen (115) kilometers), and the third route 312 is the longest route (e.g., a distance of one-hundred and forty-five (145) kilometers).

The first route 308 is the route with the shortest travel distance, however the construction zone 314 along the first route 308 can significantly reduce the speed of travel along the first route 308. As a result, the estimated travel time to traverse the first route 308 is two and one-half (2.5) hours. Further, the facility 318 (e.g., a refueling facility) and the facility 320 (e.g., a refueling facility) are in close proximity to the first route 308 and easily accessible.

The second route 310 is the route with the second shortest travel distance. Further, the second route 310 is along a single-lane road but does not have any delays or obstructions and has an estimated travel time of two (2) hours. The facility 322 (e.g., a refueling facility) is along the second route 310 but is a significant distance from the second route 310. Further, the facility 322, which is far from the starting location 302, is the first facility from the starting location 302 that is available when travelling along the second route 310. The facility 324 (e.g., an eating establishment that includes a restroom) is the second facility along the second route 310 and is in close proximity to the second route 310. The facility 326 (e.g., a refueling facility) is the third facility along the second route 310 and is also in close proximity to the second route 310.

The third route 312 is the route with the longest travel distance but is a four-lane highway and has an estimated travel time of one and one-half (1.5) hours. The facility 328 (e.g., a refueling facility) is the only facility along the third route 312, and in close proximity to the third route 312. Further, the facility 326 is a significant distance from both the starting location 302 and the destination 304.

Different travel costs can be associated with the first route 308, the second route 310, and the third route 312, depending on how the travel costs are determined and/or weighted. In this example, travel costs can be positively correlated with distance (e.g., a greater distance results in greater travel costs). Further, selection of a travel route from the first route 308, the second route 310, and the third route 312 can be based at least in part on the route with the lowest travel cost. As such selection of a travel route can be based at least in part on minimization of travel costs such that, for example, a route with lower travel costs is preferable and/or advantageous in comparison to a route that is equal in all other respects and has higher travel costs.

Determining the travel costs based on the travel distance between the starting location 302 and the destination 304, can result in the third route 312 having the greatest travel cost, the second route 310 having the second greatest travel cost, and the first route 308 having the lowest travel cost. However, determining the travel costs based on estimated travel time can result in the first route 308 having the greatest travel cost, the second route 310 having the second greatest travel cost, and the first route 310 having the lowest travel cost.

In some embodiments, travel costs can be weighted based at least in part on some combination of different and/or individual costs (e.g., travel cost associated with distance and another travel cost associated with estimated travel time). For example, assigning less weight to travel costs associated with travel distance and more weight to travel costs associated with the estimated travel time could result in the second route 310 having lower travel costs than the third route 312 that has a lower estimated travel time but a significantly greater travel distance. Assigning more weight to travel costs associated with distance and less weight to travel costs associated with estimated travel time could also result in the second route 310 having lower travel costs than the first route 308 that has a shorter travel distance but a significantly greater estimated travel time.

Different convenience costs can be associated with the first route 308, the second route 310, and the third route 312, depending on how the convenience costs are determined and/or weighted. In this example, convenience costs can be correlated with various factors including: the number of facilities along a route can be inversely correlated with convenience costs (e.g., a smaller number of facilities along a route results in greater convenience costs); the type of facilities along a route can be inversely correlated with convenience costs (e.g., a smaller number of certain types of facilities along a route results in greater convenience costs); a distance between a facility and other facilities, the starting location, and/or the destination can be positively correlated with travel costs (e.g., greater distance between facilities is positively correlated with travel costs); and/or a distance of a facility from a respective route can be positively correlated with convenience costs (e.g., a greater distance of a facility from a route results in greater convenience costs).

For example, determining the convenience costs based on the number of facilities between the starting location 302 and the destination 304, will result in the third route 312 having the greatest convenience costs, the second route 310 having the second greatest convenience costs, and the first route 308 having the lowest convenience costs and being the most advantageous and/or preferred route. However, determining the convenience costs based on the number of a specific type of facility associated with a route (e.g., a refueling facility) will result in the first route 308 and the third route 312, each of which is associated with one (1) refueling facility having the greatest convenience costs, and the second route 310 that is associated with two (2) refueling facilities having the lowest convenience costs and being the most advantageous and/or preferred route.

In some embodiments, convenience costs can be weighted based at least in part on some combination of the different types of convenience costs including the number of facilities along a route can be inversely correlated with convenience costs; the type of facilities along a route can be inversely correlated with convenience costs; and/or a distance of a facility from a respective route can be positively correlated with convenience costs.

Furthermore, determination and/or selection of a travel route (e.g., a route that will be traversed) from the first route 308, the second route 310, and the third route 312 can be determined based at least in part on one or more travel criteria which can be associated with one or more user preferences. In some embodiments, the one or more travel criteria can affect the weighting of the travel costs and/or convenience costs.

For example, assigning greater weight to travel costs can result in selection and/or determination of a shorter travel route that is less convenient (e.g., facilities are further away from the travel route) having priority over a more convenient route that is longer. Conversely, assigning greater weight to convenience costs can result in selection and/or determination of a more convenient travel route (e.g., facilities are closer to the travel route) that is longer having priority over a less convenient route that is shorter. Further, the one or more travel criteria can prioritize certain types of facilities (e.g., refueling facilities can have higher priority than recreation areas) and/or can make having certain types of facilities along a route a requirement (e.g., an eating establishment along a route can be a requirement). In some embodiments, determination of a travel route can be associated with satisfaction of at least one of the one or more travel criteria.

Figure 4:
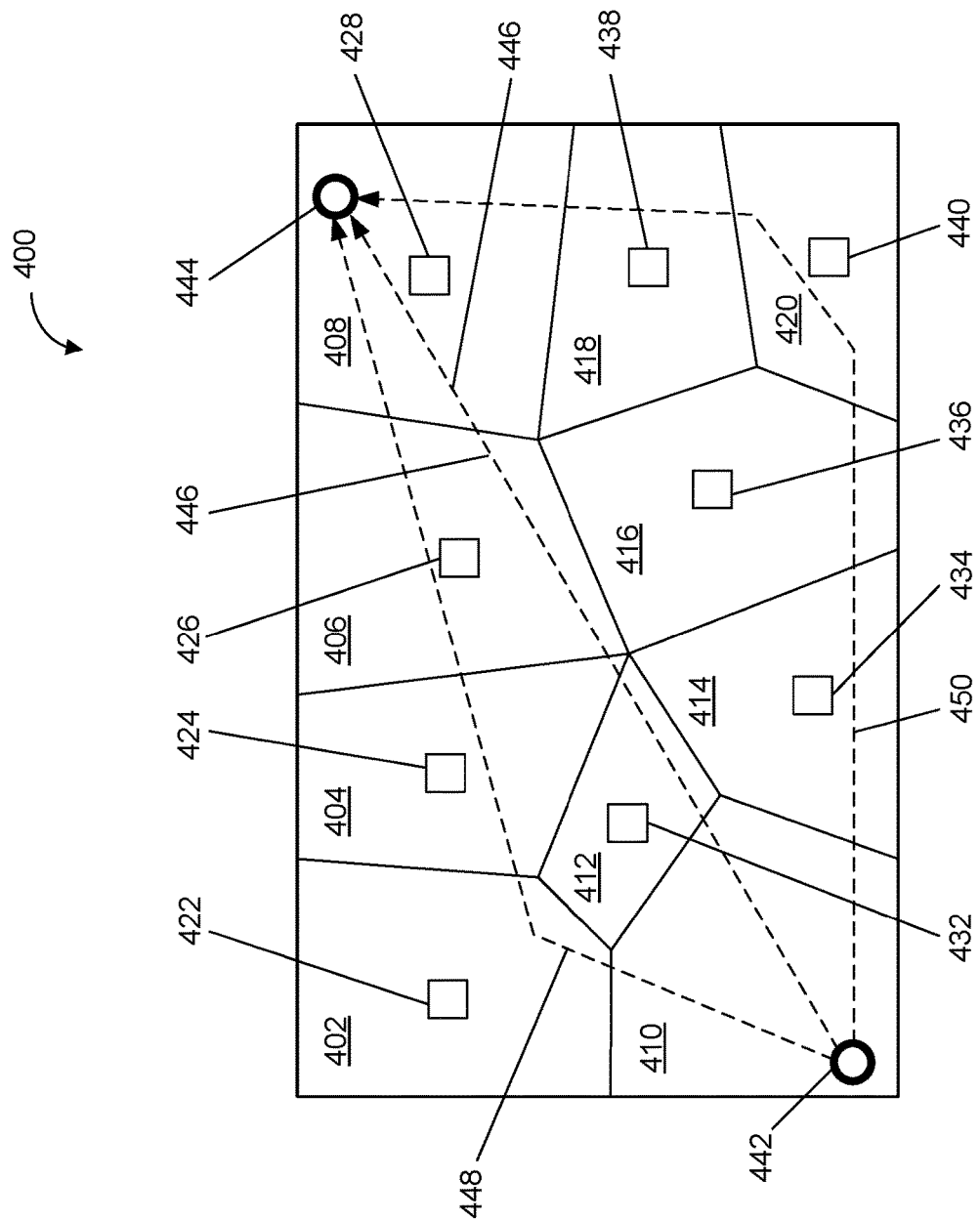
FIG. 4 depicts a Voronoi diagram associated with route planning constraints according to example embodiments of the present disclosure.

FIG. 4 depicts a Voronoi diagram associated with route planning constraints according to example embodiments of the present disclosure. Any operations and/or actions associated with a plurality of cells 400 can be performed by a computing device and/or computing system that includes one or more attributes and/or capabilities of the computing device 102, the computing system 130, the training computing system 150, and/or the one or more remote computing systems 170. As shown in FIG. 4, the plurality of cells 400 include a cell 402, a cell 404, a cell 406, a cell 408, a cell 410, a cell 412, a cell 414, a cell 416, a cell 418, a cell 420, a facility 422, a facility 424, a facility 426, a facility 428, a facility 430, a facility 432, a facility 434, a facility 436, a facility 438, a facility 440, a starting location 442, a destination 444, a route 446, a route 448, and a route 450.

The environment 400 can include any geographic region or geographic area, for example a region that includes a truck stop (e.g., the starting location 442) and a city (e.g., the destination 444) that are connected by three roads (e.g., the route 446, the route 448, and the route 450).

In this example, the first route 446 is the shortest route (e.g., a distance of two-hundred (200) kilometers between the starting location 442 and the destination 444), the second route 448 is the second shortest route between the starting location 442 and the destination (e.g., a distance of two-hundred and fifty (250) kilometers between the starting location 442 and the destination 444), and the third route 450 is the longest route between the starting location 442 and the destination (e.g., a distance of four hundred (400) kilometers between the starting location 442 and the destination 444).

The plurality of cells 400 can include Voronoi cells that are based at least in part on the locations of the facilities 422-440. For example, the cells 402-420 can be based at least in part on the Euclidean distance between sets of the facilities 422-440. In this example, the facilities 422-440 can represent refueling facilities. Further, each of the cells 402-420 can be associated with regions (e.g., geographic regions) that are associated with one or more facilities within each respective region. For example, the cell 402 can be associated with a region that is associated with the facility 422. In some embodiments, different types of facilities can be used and/or the Voronoi diagram can be based at least in part on other types of spatial relationships between the facilities 422-440. Furthermore, in some embodiments, the plurality of cells 400 can be based at least in part on a plurality of different types of facilities, such that each of the plurality of cells is associated with at least one facility from each of the plurality of different types of facilities (e.g., three different types of facilities would result in each of the plurality of cells 400 having at least three facilities, with at least one facility of each of the plurality of different types of facilities included in each cell). Additionally, each of the different types of facilities can be associated with a respective Voronoi graph. An intersection (overlay) of the respective Voronoi graphs for each different type of facility can be determined and/or generated, with the resulting joint Voronoi diagram having a plurality of cells each having at least one of each of the plurality of different types of facilities.

In some embodiments, the plurality of cells 400 can be generated based at least in part on a different set of facilities, which, if the different set of facilities are in different location can result in a different number of cells, a different size of cells, and/or a different shape of cells. For example, if the set of facilities was a set of eating establishments, the plurality of cells could be arranged differently from the arrangement depicted in FIG. 4.

The first route 446 is a direct route between the starting location 442 and the destination 444. As such, the route 446 has the shortest travel distance of the three routes 446-450. The estimated travel time to traverse the first route 446 is two (2) hours. Further, the first route 446 is associated with the cells 410/412/404/406/408, which includes the facilities 432/424/426/428, a total of four (4) facilities.

The second route 448 is the route with the second shortest travel distance. The estimated travel time to traverse the second route 448 is two and a half (2.5) hours. Further, the second route 448 is associated with the cells 410/402/404/406/408, which include the facilities 422/424/426/428, a total of four (4) facilities.

The third route 450 is the route with the longest travel distance. The estimated travel time to traverse the third route 448 is four (4) hours. Further, the third route 450 is associated with the cells 410/414/416/420/418/408, which include the facilities 434/436/440/438/428, a total of five (5) facilities.

Different travel costs can be associated with the first route 446, the second route 448, and the third route 450, depending on how the travel costs are determined and/or weighted. In this example, travel costs can be positively correlated with distance (e.g., a greater route distance results in greater travel costs). Further, travel costs can be minimized such that a route with lower travel costs is preferable and/or advantageous in comparison to a route that is equal in all other respects and has higher travel costs. Determining the travel costs based on the travel distance between the starting location 442 and the destination 444, will result in the third route 450 having the greatest travel cost, the second route 448 having the second greatest travel cost, and the first route 446 having the lowest travel cost.

Different convenience costs can be associated with the first route 446, the second route 448, and the third route 450, depending on how the convenience costs are determined and/or weighted. In this example, convenience costs can be based at least in part on the number of facilities along each respective route which can be inversely correlated with convenience costs (e.g., a smaller number of facilities along a route results in greater convenience costs). As such, the convenience costs associated with the route 446 and the route 448, which are associated with four (4) facilities each will be greater than the convenience costs for the route 450 which is associated with five (5) facilities.

Based on the travel costs and the convenience costs associated with the routes 446-450, the route 446 and the route 448 are associated with the same number of facilities and have the same convenience costs, however the route 446 is shorter and has lower travel costs, which based only on the travel costs and convenience costs gives the route 446 lower total costs (e.g., the combined travel costs and convenience costs). The route 450 is associated with five (5) facilities which gives the route 450 lower convenience costs than the route 446. However, due to its shorter distance the route 446 has lower travel costs than the route 450. Determination of whether the route 446 or the route 450 has the lower total cost can be based at least in part on a weighting of the travel costs and the convenience costs. If the travel costs are sufficiently more heavily weighted than the convenience costs, the route 446 may have lower total costs than the route 450. If the convenience costs are sufficiently more heavily weighted than the travel costs, the route 450 may have lower total costs than the route 446.

In some embodiments, determination of a travel route (e.g., a route selected for travel by a user) can be based at least in part on an intersection of the travel routes (e.g., the first travel route 446, the second route 448, and the third route 450) with the cells (e.g., the cells 402-420) associated with the geographic regions. For example, the travel route can be based at least in part on the travel route with the lowest combined travel costs and convenience costs that satisfy one or more travel criteria (e.g., the user prefers that a travel route includes at least one eating establishment).

Furthermore, determination and/or selection of a travel route (e.g., a route that will be traversed) from the first route 446, the second route 448, and the third route 450 can be determined based at least in part on one or more travel criteria which can be associated with one or more user preferences. The one or more travel criteria can affect the weighting of the travel costs and/or convenience costs. For example, assigning greater weight to travel costs can result in selection and/or determination of a shorter travel route that is less convenient (e.g., facilities are further away from the travel route) having priority over a more convenient route that is longer. Conversely, assigning greater weight to convenience costs can result in selection and/or determination of a more convenient travel route (e.g., facilities are closer to the travel route) that is longer in distance having priority over a less convenient route that is shorter. Further, the one or more travel criteria can prioritize certain types of facilities (e.g., refueling facilities can have higher priority than recreation areas) and/or can make having certain types of facilities along a route a requirement (e.g., an eating establishment along a route can be a requirement).

Figure 5:
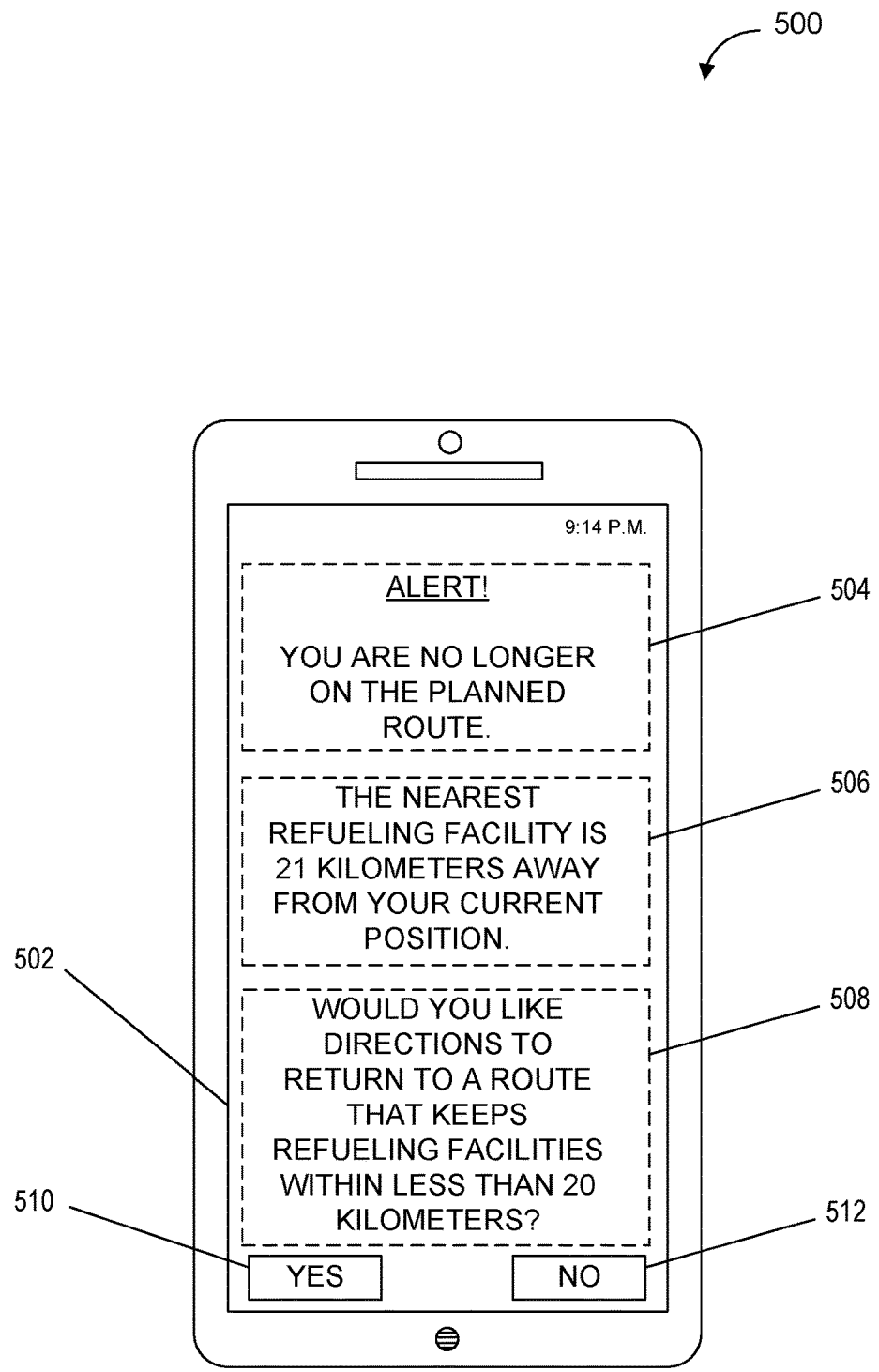
FIG. 5 depicts an example of an interactive route notification interface of a navigation device according to example embodiments of the present disclosure.

FIG. 5 depicts an example of an interactive route notification interface of a navigation device according to example embodiments of the present disclosure. A navigation computing device 500 can include one or more attributes and/or capabilities of the computing device 102, the computing device 200, the computing system 130, the training computing system 150, and/or the one or more remote computing systems 170. Furthermore, the navigation computing device 500 can perform one or more actions and/or operations including the one or more actions and/or operations performed by the computing device 102, the computing system 130, the training computing system 150, and/or the one or more remote computing systems 170, which are depicted in FIG. 1. As shown in FIG. 5, the navigation computing device 500 includes a display component 502, an indication 504, an indication 506, an indication 508, an interface control element 510, and an interface control element 512.

The navigation computing device 500 can be configured to receive data and/or information including travel data, route data, data associated with the one or more travel costs, and/or data associated with the one or more convenience costs. For example, the navigation computing device 500 include a personal computing device (e.g., a smartphone) or an in-vehicle navigation system that can receive one or more wireless signals that include route data indicating a travel route for a user of the navigation computing device 500.

As shown, the navigation computing device 500 includes a display component 502 that can display imagery including one or more indications, one or more pictures, and/or one or more graphics. Further, the display component 502 can be configured to detect interactions with the display component 502. For example, the display component 502 can detect interaction using one or more sensors including one or more capacitive sensors, one or more resistive sensors, one or more light sensors, one or more pressure sensors, and/or one or more acoustic sensors. By way of further example, the display component can be a touch sensitive display that can detect one or more touches by a user of the navigation computing device 500.

In this example, the navigation computing device 500 is configured to determine the location of the navigation computing device 500 (e.g., use one or more GPS signals to determine the latitude and longitude of the navigation computing device 500). Further, the navigation computing device 500 has received route data from a remote computing system (e.g., a server computing system that has the capabilities and/or attributes of the computing system 130 and that is configured to send and receive travel data and/or route data).

Based on the route data, the navigation computing device 500 can determine whether the navigation computing device 500 is within a predetermined threshold distance of the travel route. Based on a determination by the navigation computing device 500 that the navigation computing device 500 is not within the threshold distance of twenty (20) kilometers from the travel route, the navigation computing device 500 can generate and display the indication 504 which reads "ALERT! YOU ARE NO LONGER ON THE PLANNED ROUTE." As such a user of the navigation computing device 500 can be notified that the user has left the travel route.

Additionally, the navigation computing device 500 can generate and display the indication 506 which reads "THE NEAREST REFUELING FACILITY IS 21 KILOMETERS AWAY FROM YOUR CURRENT POSITION." In this way, the navigation computing device 500 can provide information to the user indicating the extent to which the user has deviated from the travel route.

Furthermore, the navigation computing device 500 can generate and display the indication 508, which is a prompt that reads "WOULD YOU LIKE DIRECTIONS TO RETURN TO A ROUTE THAT KEEPS REFUELING FACILITIES WITHIN LESS THAN 20 KILOMETERS?" In some embodiments, any combination of the indication 504, the indication 506, and/or the indication 508 can be accompanied by an audible indication (e.g., a chiming sound) and/or a haptic indication (e.g., vibration of the navigation computing device 500) that is generated by the navigation computing device 500.

A user can respond to the indication 508 via the interface control element 510 ("YES") or the interface control element 512 ("NO") which are configured to detect an interaction (e.g., a touch) by a user and perform one or more operations following detection of the interaction. For example, if the user touches (e.g., presses) the interface control element 510 ("YES"), the navigation computing device 500 can determine a travel route from the current location of the navigation computing device 500 to the destination used in the previous route. Further, the travel route from the current location to the destination can be based at least in part on the determination of one or more travel costs, one or more convenience costs, and/or one or more travel criteria as described herein.

By way of further example, if the user touches (e.g., swipes) the interface control element 512 ("NO"), the navigation computing device 500 can generate another indication asking the user if the user would like to change their destination (e.g., "WOULD YOU LIKE TO ENTER A NEW DESTINATION?"). Alternatively, the navigation computing device 500 can generate another indication with an updated distance from the nearest facility after some predetermined distance has been travelled (e.g., two (2) kilometers) or some predetermined time interval (e.g., five (5) minutes) has elapsed.

Figure 6:
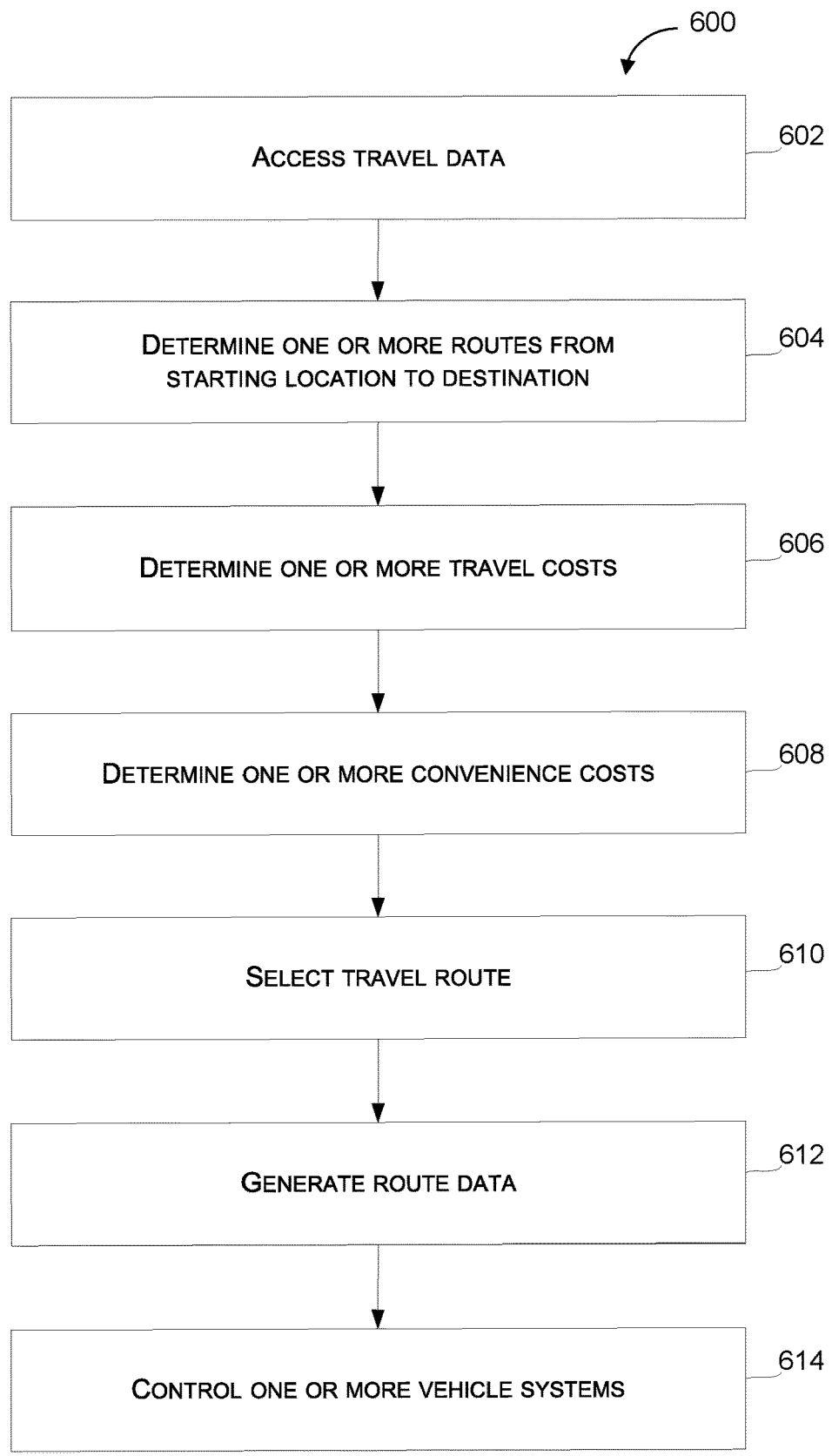
FIG. 6 depicts a flow diagram of constrained route planning according to example embodiments of the present disclosure.

FIG. 6 depicts a flow diagram of constrained route planning according to example embodiments of the present disclosure. One or more portions of the method 600 can be executed and/or implemented on one or more computing devices or computing systems including, for example, the computing device 102, the computing system 130, the training computing system 150, and/or the remote computing system 170. Further, one or more portions of the method 600 can be executed or implemented as an algorithm on the hardware devices or systems disclosed herein. FIG. 6 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 602, the method 600 can include accessing travel data. The travel data can include information associated with a starting location and/or a destination. Further, the travel data can include information associated with one or more locations and/or one or more regions (e.g., geographic regions) that can include the starting location and the destination. In some embodiments, the travel data can include information associated with a type of transportation that will be used to traverse a route (e.g., foot travel, ground-based vehicle, and/or aircraft).

For example, the computing device 102 (e.g., a navigation device) can access travel data including a starting location (e.g., a current location of the computing device 102 including a latitude, longitude, and/or altitude) and a destination (e.g., a destination including a latitude, longitude, and/or altitude to which the computing device 102 will travel). In some embodiments, the starting location and/or the destination can be based at least in part on a combination of user input (e.g., a destination to which the user wishes to travel that is provided to the computing device 102) and one or more operations performed by the computing device 102 (e.g., determining the current location of the computing device 102 based at least in part on one or more GPS signals). associated with each of the starting location and the destination respectively. By way of further example, the travel data can be accessed by the computing system 130, which can perform one or more operations on the travel data and/or send the travel data to another system and/or device which can include the computing device 102.

In some embodiments, the travel data can include information associated with a geographic area including one or more regions that can include the starting location and/or the destination. In particular, the travel data can include information associated with the location, type, and/or state of one or more facilities within the geographic area including the starting location and/or the destination. With respect to the location of a facility, the travel data can include a latitude, longitude, and/or altitude associated with a facility; directions to a facility from the starting location and/or a current location of the navigation device; and/or directions from the facility to the destination. With respect to the type of a facility, the travel data can indicate whether a facility is a refueling facility, an eating establishment, a lavatory, a recreation area. With respect to the state of the facility, the travel data can indicate whether a facility is open or closed; the hours of operation of a facility and/or whether the hours of operation coincide with an estimated time that a travel route will be traversed; a description of the appearance of a facility; and/or a description of the amenities that are available within the facility (e.g., the amount of bathrooms and/or bathing stalls at a truck stop).

Further, the travel data can include the location of one or more road segments (e.g., segments of a transportation network including highways, streets, and/or foot paths), bodies of water (lakes, swamp, ponds), waterways (rivers, canals), buildings (e.g., police stations, fire stations, and/or hospitals), bridges, tunnels, overpasses, and/or underpasses.

In some embodiments, the location data can include information associated with the conditions of the one or more regions including weather conditions, construction zones, and/or road detours.

In some embodiments, the travel data can include information that indicates a form of transportation and/or mode of travel that is associated with travelling from the starting location to the destination. By way of example, the form of transportation and/or mode of travel can include foot travel, cycling, a ground-based motor vehicle (e.g., an automobile, truck, or bus), a boat, an amphibious vehicle (e.g., a hovercraft), and/or an aircraft (e.g., an airplane or helicopter).

In some embodiments, the travel data can be based at least in part on data and/or information associated with images of geographic areas. Further, the computing system (e.g., the computing system 102) can determine the location of one or more facilities based at least in part on image content analysis of imagery (e.g., satellite images, street level imagery, and/or any other images including user-generated imagery and/or publicly accessible street-level imagery). Further, image content analysis of imagery can include semantic segmentation of images that can be used to determine the location of one or more facilities based at least in part on features of the imagery.

At 604, the method 600 can include determining one or more routes. The one or more routes can include one or more routes from the starting location to the destination. Further, each of the one or more routes can be associated with one or more regions. For example, the computing device 102 and/or the computing system 130 can access the travel data, which can include information associated with a geographic area including the starting location and the destination. The travel data can also include information associated with one or more features of the geographic area including the starting location and the destination. The one or more features of the geographic area can include natural geographic features (e.g., lakes, ponds, swamps, mountains, hills, ravines, and/or rivers) and/or artificial geographic features (e.g., buildings, roads, canals, bridges, overpasses, underpasses, tunnels, and/or dams). The computing device 102 and/or the computing system 130 can then perform one or more operations on the travel data in order to determine the one or more routes.

The one or more features of the geographic area including the starting location and the destination can be used to determine the one or more routes between the starting location and the destination that are navigation that are navigable using one or more different forms of transportation and/or modes of travel (e.g., foot travel, cycling, a ground-based motor vehicle, a boat, an amphibious vehicle, and/or an aircraft). For example, the computing device 102 and/or the computing system 130 can use the one or more features of the geographic area to determine, based on the form of transportation being used, one or more routes that not are obstructed by one or more geographic features (e.g., a lake between the starting location and destination can obstruct foot travel between the starting location and the destination). However, if the form of transportation used to travel from the starting location to the destination include a boat or if a ferry can be used by a ground-based form of transportation to cross the lake, the one or more routes can include routes that traverse the lake.

Further, the computing device 102 and/or the computing system 130 can access the travel data to determine the one or more routes that include one or more road segments (e.g., one or more portions of roads, streets, and/or other travel surfaces). Further, the computing device 102 can determine the one or more routes that include one or more road segments that are contiguous between the starting location and the destination so that, for example, a motor vehicle can travel along a road for the entire distance or almost (e.g., greater than ninety-five percent (95%)) of the distance between the starting location and the destination. In some embodiments, the portion of a route between the starting location and the destination that is composed of the one or more road segments can be based at least in part on a predetermined range. For example, a range of fifty (50%) predetermined range would require fifty percent (50%) of a route between the starting location and the destination to be covered by the one or more road segments.

At 606, the method 600 can include determining one or more travel costs. The one or more travel costs can be respectively associated with travelling from the starting location to the destination via each of the one or more routes. Further, the one or more travel costs can be associated with and/or based at least in part on any of the costs associated with travelling from the starting location to the destination including costs associated with: the amount of time to travel a respective route; a distance of a respective route; an amount of fuel and/or energy (e.g., fuel used by an internal combustion vehicle or electric energy stored in a battery used by an electric vehicle) required to travel a respective route; an amount of pollution or environmental impact associated with travelling a respective route; and/or an impact on traffic or crowding associated with travelling a respective route.

For example, the computing device 102 and/or the computing system 130 can access the travel data to determine one or more distances between the starting location and the destination along the one or more routes. The computing device 102 and/or the computing system 130 can then determine a travel cost associated with the distance of the travel route that is positively correlated with and proportional to the distance of the travel route (e.g., doubling the distance of the travel route will double the travel cost). Further, the computing device 102 and/or the computing system 130 can determine a travel cost associated with a fuel estimate (e.g., the amount of fuel that is estimated to be required to travel each of the one or more routes). The computing device 102 and/or the computing system 130 can then determine a travel cost associated with the fuel estimate. The travel cost can be positively correlated with and proportional to the fuel estimate for the route (e.g., a ten percent (10%) increase in the fuel estimate will increase the travel cost by ten percent (10%)).

In some embodiments, the one or more travel costs can be averages, combined, and/or weighted. For example, the travel cost associated with the distance of the travel route and the travel cost associated with the fuel estimate can be weighted so that the travel cost associated with the fuel estimate is weighted more heavily than the travel cost associated with the distance of the travel route. By way of further example, the one or more travel costs can be combined so that the one or more travel costs are the sum of each individual travel cost.

At 608, the method 600 can include determining one or more convenience costs. The one or more convenience costs can be respectively associated with an availability of one or more facilities within the one or more regions associated with each of the one or more routes. For example, the computing device 102 and/or the computing system 130 can determine the availability of the one or more facilities by accessing the travel data that includes information associated with the location of each of the one or more facilities that are within each of the one or more regions associated with each of the one or more routes.

Further, the one or more convenience costs can be associated with and/or based at least in part on any of the costs associated with the number of the one or more facilities along each of the one or more routes; the types of facilities along each of the one or more routes; the proximity of each of the one or more facilities to each of the one or more routes; the location of each of the one or more facilities; the extent to which each of the one or more facilities along each of the one or more routes satisfies one or more user preferences.

For example, the computing device 102 and/or the computing system 130 can access the travel data to determine the number of the one or more facilities along each of the one or more routes. The computing device 102 and/or the computing system 130 can then determine a convenience cost associated with the number of the one or more facilities that is inversely correlated with the number of the one or more facilities along each of the one or more routes (e.g., more facilities along a route will reduce the convenience cost associated with that route). Further, the computing device 102 and/or the computing system 130 can determine a convenience cost associated with the facility proximity of each of the one or more facilities to each of the one or more routes (e.g., a distance of each of the one or more facilities to the nearest portion of each of the one or more routes). The computing device 102 and/or the computing system 130 can then determine a convenience cost associated with the facility proximity. The convenience cost can be inversely correlated with the facility proximity for the route (e.g., a route with one or more facilities that are closer to the route will have a lower convenience cost than a route that is the same in all other respects other than having one or more facilities that are further away from the route).

In some embodiments, the one or more convenience costs can be based at least in part on a ranking and/or priority of the different individual one or more convenience costs (e.g., the convenience cost associated with the number of facilities can be ranked higher than the convenience cost associate with facility proximity, and the ranking can be dispositive of the one or more convenience costs to the exclusion of other convenience costs below some ranking threshold); averages of different individual convenience costs (e.g., an average or mean of the convenience cost associated with the number of facilities and the convenience cost associated with facility proximity), combinations of different individual one or more convenience costs (e.g., a sum of the convenience cost associated with the number of facilities and the convenience cost associated with facility proximity), and/or a weighted average of different individual one or more convenience costs (e.g., a weighted average in which the convenience cost associated with the number of facilities is weighted more heavily than the convenience cost associated with facility proximity).

By way of example, the convenience cost associated with the distance of the travel route and the convenience cost associated with the fuel estimate can be weighted so that the convenience cost associated with the fuel estimate is weighted more heavily than the convenience cost associated with the distance of the travel route. By way of further example, the one or more convenience costs can be combined so that the one or more convenience costs are the sum of each individual convenience cost.

At 610, the method 600 can include selecting and/or determining one or more travel routes (e.g., a travel route) from the one or more routes. Selection and/or determination of the travel route can be based at least in part on the one or more travel costs, the one or more convenience costs, and/or one or more travel criteria. Further, the one or more travel criteria can be associated with one or more travel preferences (e.g., one or more travel preferences of a user that will be travelling along the travel route). By way of example, the computing device 102 and/or the computing system 130 can, for each of the one or more routes, add the one or more travel costs and the one or more convenience costs to determine a total cost. The one or more travel costs and the one or more convenience costs can be adjusted (e.g., weighted) based at least in part on the one or more preferences (e.g., user preferences). The one or more routes can then be ranked and/or prioritized based on their respective total cost. Further, the one or more travel criteria can be applied to the one or more routes and the travel route can be based at least in part on the route of the one or more routes that satisfies the one or more travel criteria (or satisfies the largest number of the one or more travel criteria) and has the highest total cost (e.g., the highest combination of the one or more travel costs and the one or more convenience costs).

In some embodiments, selecting and/or determining the travel route can include accessing travel data (e.g., the computing device 102 and/or the computing system 130 accessing the travel data) that includes information that divides the geographic area between the starting location and the destination into a plurality of cells or regions (e.g., cells of a Voronoi diagram). In some embodiments, each of the plurality of cells of the Voronoi diagram can be associated with a respective region that can be determined based at least in part on the location and/or type of the one or more facilities.

For example, the locations of a plurality of refueling facilities can be determined and a plurality of cells of the Voronoi diagram can be associated with each of the plurality of refueling facilities based at least in part on the distance between each refueling facility. Further, an intersection between the one or more routes from the starting location to the destination and the plurality of cells of the Voronoi diagram associated with the plurality of refueling facilities can be used to determine the travel route. For example, each of the cells of the Voronoi diagram can be associated with a total cost (e.g., a combined travel cost and convenience cost for the cell). Further, each route can be associated with a route cost that can be based at least in part on an aggregation of the total costs of the cells through which a route passes. The travel route can be the route that is associated with the lowest route cost that also satisfies the one or more travel criteria.

By way of further example, a plurality of Voronoi diagrams associated with each of the different types of the one or more facilities (e.g., refueling facilities, eating establishments, and recreation areas) can be generated (e.g., a first Voronoi diagram for refueling facilities, a second Voronoi diagram for eating establishments, and a third Voronoi diagram for recreation areas). Further, each of the plurality of Voronoi diagrams (e.g., the first Voronoi diagram, the second Voronoi diagram, and the third Voronoi diagram) can have a respective plurality of cells that can be based at least in part on one or more constraints (e.g., one or more constraints associated with the one or more travel criteria) including the locations of the one or more facilities; and/or the distances between the one or more facilities and the one or more routes. An intersection (e.g., an overlay) of the plurality of Voronoi diagrams associated with the different types of the one or more facilities can then be determined and/or generated, such that each of the cells in the resulting subdivision of the Voronoi diagrams can be associated with at least one of the different types of the one or more facilities (e.g., each cell would include a refueling facility, an eating establishment, and a recreation area).

At 612, the method 600 can include generating route data. The route data can include information associated with any aspect of the one or more routes, the one or more regions, and/or the one or more facilities. Further, the route data can include information associated with one or more indications that can be based at least in part on the travel route. Furthermore, the route data can include information associated with: one or more locations of the one or more facilities along the travel route (e.g., a latitude, longitude, and/or altitude of each of the one or more facilities); the distance between the current location (e.g., the current location of a user and/or device travelling on the travel route or within a predetermined distance of travel route) and the starting location; the distance between the current location and the destination; the distance between the current location and any of the one or more facilities associated with the travel route; and/or the distance between the current location and the nearest portion of the travel route.

By way of example, the computing device 102 can generate route data that includes information associated with the nearest refueling facility and the distance to the refueling facility. The computing device 102 can then generate one or more indications including images and/or text associated with the nearest refueling facility (e.g., a photograph of the refueling facility and/or text describing the nearest refueling facility) that can be displayed on a display component of the computing device 102. By way of further example, the route data can be accessed by the computing system 130, which can perform one or more operations on the travel data and/or send the route data to another system and/or device which can include the computing device 102.

At 614, the method 600 can include controlling one or more vehicle systems of a vehicle. Control of the one or more vehicle systems can be based at least in part on the route data. The one or more vehicle systems can include one or more motor systems, one or more steering systems, one or more notification systems, and/or one or more energy systems (e.g., a fuel tank and/or electric battery that can be associated with a system to monitor an available amount of energy). For example, the server computing system 130 can generate the route data and send the route data to the computing device 102, which can be a personal navigation device (e.g., a smart phone) configured to communicate with a vehicle and/or part of a vehicle computing system of a vehicle. The computing device 102 can use the route data to determine the location of facilities along the route and can then control notification systems including an in-vehicle audio system that can be used to generate indications (e.g., notifications) providing information associated with the route data including the location of nearby facilities, whether the vehicle is outside a desired proximity of a facility, and/or any other associated information about the travel route.

By way of further examples, the computing device 102 can use the route data to estimate an amount of energy (e.g., an amount of fuel (e.g., gas and/or petroleum) and/or electrical energy stored in a battery) that is required to use the travel route to travel from the starting location to the destination. Further, the computing device 102 can access one or more energy systems of the vehicle to determine an energy level (e.g., an amount of fuel stored in a fuel tank and/or electrical energy stored in a battery) of the vehicle. Based at least in part on a comparison of the estimated amount of energy required to travel the travel route and the energy level of the vehicle, the computing device 102 can determine whether the vehicle has sufficient energy to reach the destination and/or the nearest refueling facility.

Figure 7:
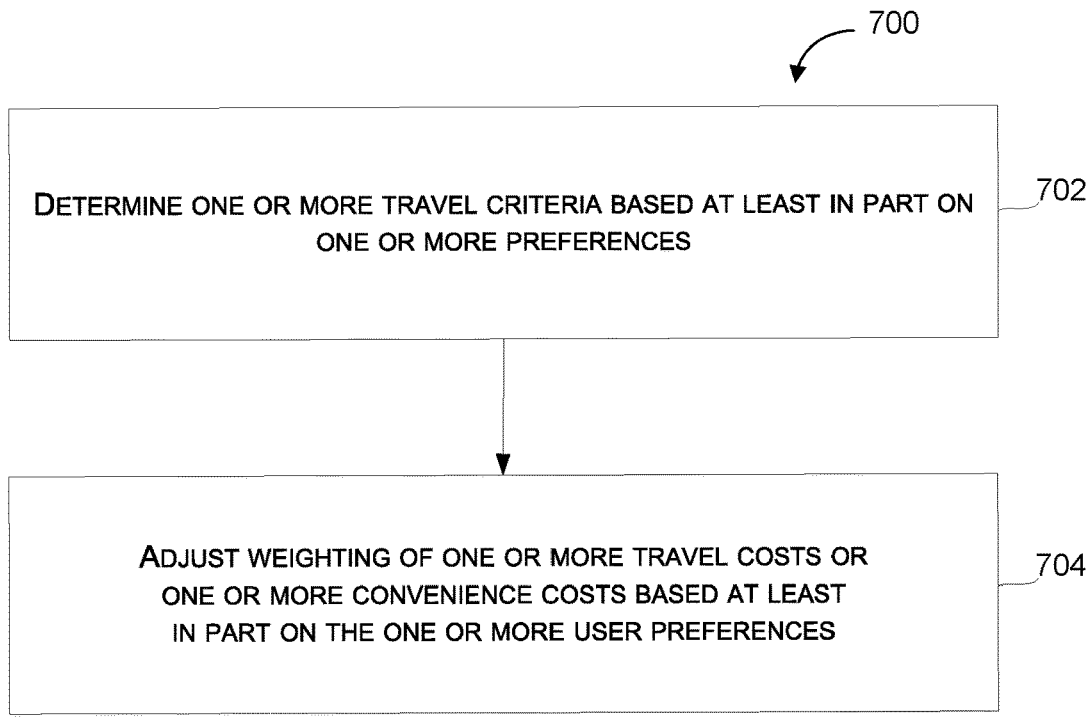
FIG. 7 depicts a flow diagram of constrained route planning according to example embodiments of the present disclosure.

FIG. 7 depicts a flow diagram of constrained route planning according to example embodiments of the present disclosure. One or more portions of the method 700 can be executed and/or implemented on one or more computing devices or computing systems including, for example, the computing device 102, the computing system 130, the training computing system 150, and/or the remote computing system 170. Further, one or more portions of the method 700 can be executed or implemented as an algorithm on the hardware devices or systems disclosed herein. In some embodiments, one or more portions of the method 700 can be performed as part of the method 600 that is depicted in FIG. 6. FIG. 7 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 702, the method 700 can include determining the one or more travel criteria. The one or more travel criteria can be based at least in part on one or more user preferences. For example, the computing device 102 can access user preference data comprising information associated with the preferences of one or more users. The user preference data can include information associated with a distance factor associated with an upper threshold for the distance of a travel route (e.g., the selected travel route will be less than twice (2 times) the distance of the shortest estimated travel distance). The computing device 102 will then include the one or more user preferences as part of the one or more travel criteria. By way of further example, the user computing device 102 can generate one or more user preference indications on a display component of the user computing device 102. The one or more user preference indications can request user preference information from the user using a checklist that lists facilities by type (e.g., refueling facilities, eating establishments, and/or recreation areas) and allows the user to select (e.g., choose a facility type that is most preferred) and/or rank (e.g., indicate a numeric rank next to a facility type). By way of further example, the one or more travel criteria can be determined by the computing system 130, which can perform one or more operations associated with the one or more user preferences and send the one or more user preferences to another device which can include the computing device 102.

In some embodiments, the one or more user preferences can be stored only on one or more computing device personally used or authorized by the user (e.g., the computing device 102) and not provided to other systems and/or devices that are not used or authorized by the user. Further, the one or more user preferences can be encrypted and/or anonymized in a privacy enhancing way that, without the consent of the user, does not publicly disclose the identity of the user, the location of the user, and/or personal information associated with the user.

At 704, the method 700 can include adjusting a weighting of the one or more travel costs or the one or more convenience costs. Adjustment of the weighting of the one or more travel costs or the one or more convenience costs can be based at least in part on the one or more user preferences. For example, the computing device 102 can access user preference data that indicates that the associated user prioritizes travel time over the availability of facilities along a route. The computing device 102 can then increase the weighting of the one or more travel costs so that the one or more travel costs are more determinative of the travel route that is determined and/or selected. By way of further example, adjusting a weighting of the one or more travel costs or the one or more convenience costs can be performed by the computing system 130, which can send data associated with the one or more travel costs and/or one or more convenience costs that have been adjusted to another system and/or device which can include the computing device 102.

Figure 8:
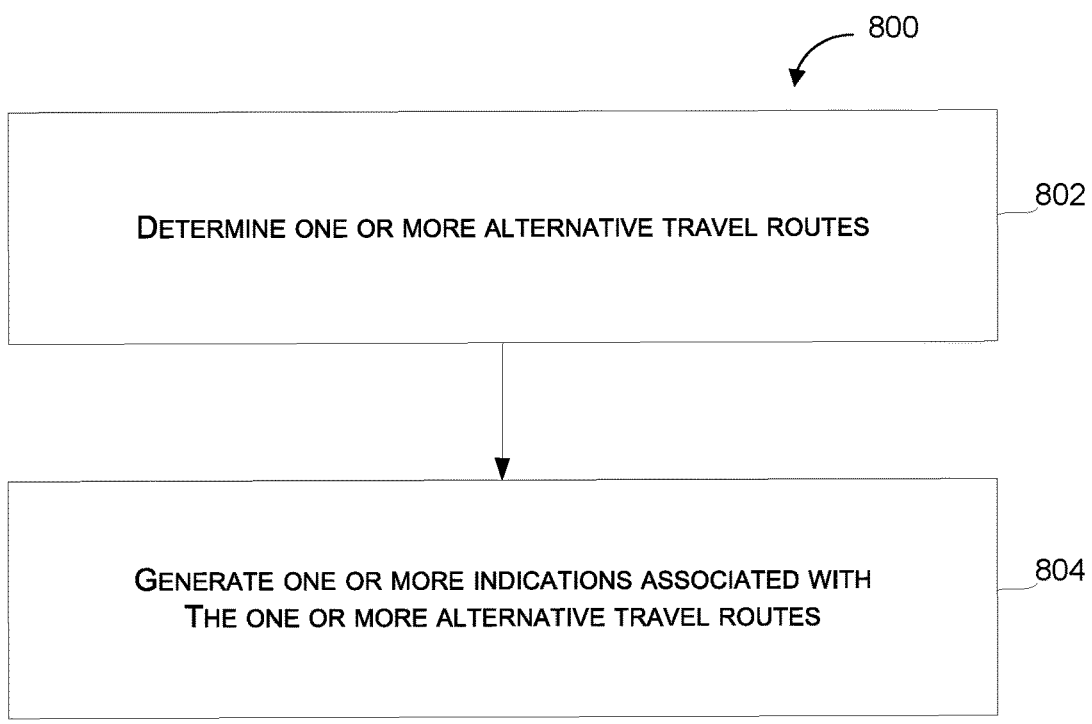
FIG. 8 depicts a flow diagram of constrained route planning according to example embodiments of the present disclosure.

FIG. 8 depicts a flow diagram of constrained route planning according to example embodiments of the present disclosure. One or more portions of the method 800 can be executed and/or implemented on one or more computing devices or computing systems including, for example, the computing device 102, the computing system 130, the training computing system 150, and/or the remote computing system 170. Further, one or more portions of the method 800 can be executed or implemented as an algorithm on the hardware devices or systems disclosed herein. In some embodiments, one or more portions of the method 800 can be performed as part of the method 600 that is depicted in FIG. 6. FIG. 8 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 802, the method 800 can include determining one or more alternative travel routes. The one or more alternative travel routes can be selected from and/or determined based at least in part on the one or more routes. Determination of the one or more alternative travel routes can be based at least in part on the one or more travel costs, the one or more convenience costs, and/or the one or more travel criteria. The one or more alternative travel routes can include the one or more routes that satisfy the one or more travel criteria and/or have a lowest combination of the one or more travel costs and/or the one or more convenience costs. For example, the computing system 130 can use the one or more routes (e.g., the one or more routes determined and/or generated in 604 of the method 600 that is depicted in FIG. 6) to determine one or more alternative routes that include the second and third highest priority routes based at least in part on a combination of their one or more travel costs, one or more convenience costs, and satisfaction of the one or more travel criteria. By way of further example, the one or more alternative routes can be determined by the computing device 102.

At 804, the method 800 can include generating route data that can include information associated with one or more alternative indications associated with the one or more alternative routes. For example, the computing system 130 can generate route data that includes information associated with the one or more alternative indications. The computing system 130 can then send the route data to the computing device 102. The one or more alternative indications can include visual indications that show the one or more alternative routes superimposed over the travel route. For example, the one or more alternative routes can be displayed on a display device of the computing device 102 in a different color or pattern from the respective color or pattern used to display the travel route. By way of further example, the route data can be generated by the computing system 102.

Figure 9:
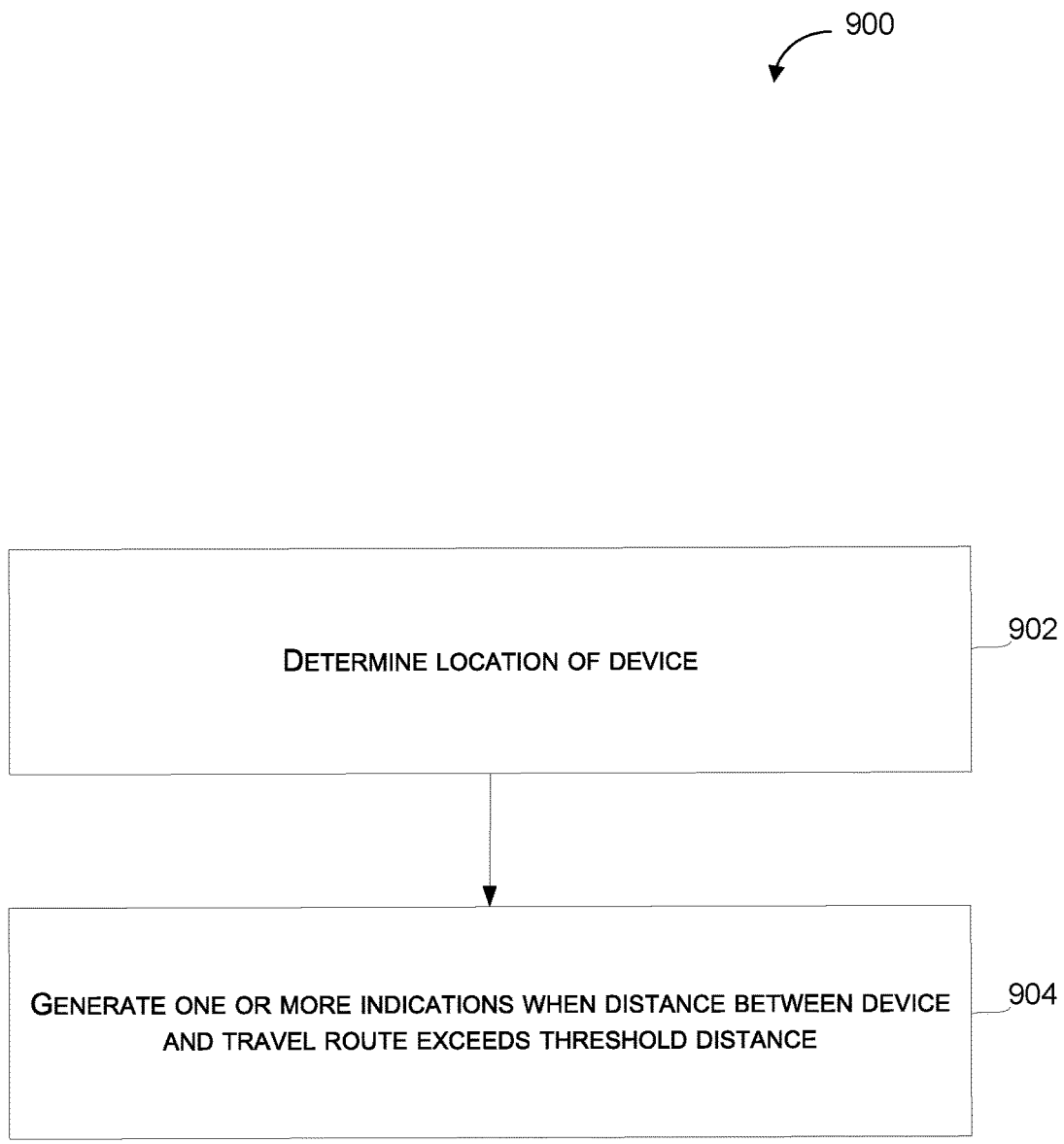
FIG. 9 depicts a flow diagram of constrained route planning according to example embodiments of the present disclosure.

FIG. 9 depicts a flow diagram of constrained route planning according to example embodiments of the present disclosure. One or more portions of the method 900 can be executed and/or implemented on one or more computing devices or computing systems including, for example, the computing device 102, the computing system 130, the training computing system 150, and/or the remote computing system 190. Further, one or more portions of the method 900 can be executed or implemented as an algorithm on the hardware devices or systems disclosed herein. In some embodiments, one or more portions of the method 900 can be performed as part of the method 600 that is depicted in FIG. 6. FIG. 9 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 902, the method 900 can include determining the location of a device (e.g., the computing device 102) associated with the travel route. In some embodiments, the device can include a vehicle, a computing system associated with a vehicle (e.g., an in-vehicle computing system), and/or a navigation device (e.g., a smartphone). For example, the computing device 102 can determine the location of the computing device 102 based at least in part on one or more signals from a positioning satellite (e.g., GPS signals).

At 904, the method 900 can include generating one or more indications when a distance between the device and the travel route is equal to or exceeds a threshold distance. For example, the computing device 102 can determine an offset distance between the current location and the nearest portion of the travel route. The computing device 102 can then compare the offset distance to the threshold distance to determine whether the offset distance exceeds the threshold distance. When the offset distance exceeds the threshold distance, the computing device 102 can generate one or more indications including one or more aural indications and/or one or more visual indications. For example, the computing device 102 can generate an aural indication announcing (e.g., through a loudspeaker) that the distance between the travel route and the device exceeds a distance threshold.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of navigation, the computer-implemented method comprising:
accessing, by a computing system comprising one or more processors, travel data stored in a memory device, the travel data comprising information associated with a starting location and a destination;
determining, by the computing system, a plurality of routes from the starting location to the destination, wherein each of the plurality of routes is associated with one or more regions;
determining, by the computing system, one or more travel costs respectively associated with travelling from the starting location to the destination via each of the plurality of routes;
determining, by the computing system, one or more convenience costs respectively associated with an availability of one or more facilities which are located away from the plurality of routes and within the one or more regions associated with each of the plurality of routes, wherein a convenience cost associated with a respective route among the plurality of routes is determined based on: a positive correlation of a distance between the respective route and each of the one or more facilities located away from the respective route and within the one or more regions associated with the respective route, an inverse correlation of a number of facilities within the one or more regions associated with the respective route, and an inverse correlation of a number of types of facilities within the one or more regions associated with the respective route;
selecting, by the computing system, based at least in part on the one or more travel costs, the one or more convenience costs, and one or more travel criteria, a travel route from the plurality of routes that is associated with a lowest combination of the one or more travel costs and the one or more convenience costs and that also satisfies the one or more travel criteria, wherein the one or more travel criteria are associated with travel preferences;
generating, by the computing system, route data comprising information associated with the travel route;
generating, by the computing system, one or more indications associated with the travel route, in response to determining, via a position device, a location of a device in relation to the travel route; and
controlling, by the computing system, one or more vehicle systems of a vehicle based at least in part on the route data to control navigation of the vehicle by causing the vehicle to navigate along the travel route,
wherein controlling the one or more vehicle systems comprises controlling one or more motor systems, one or more steering systems, or one or more braking systems.

2. The computer-implemented method of claim 1, wherein the one or more travel criteria are based at least in part on one or more preferences associated with the one or more travel costs or the one or more convenience costs.

3. The computer-implemented method of claim 1, further comprising:
determining, by the computing system, the one or more travel criteria based at least in part on one or more user preferences; and
adjusting, by the computing system, a weighting of the one or more travel costs or the one or more convenience costs based at least in part on the one or more user preferences.

4. The computer-implemented method of claim 1, wherein the one or more travel costs are based at least in part on a maximum travel time or a maximum travel distance associated with the plurality of routes.

5. The computer-implemented method of claim 1, wherein the one or more convenience costs are based at least in part on a priority established for each type of the one or more facilities, wherein a first facility having a priority higher than a second facility is weighted more heavily than the second facility.

6. The computer-implemented method of claim 1, wherein the one or more travel costs are based at least in part on an estimated distance or an estimated travel time associated with each of the plurality of routes.

7. The computer-implemented method of claim 1, wherein generating, by the computing system, the one or more indications associated with the travel route, is in response to determining, via the position device, that the location of the device corresponds to a distance greater than a threshold distance from a facility within one or more regions associated with the travel route.

8. The computer-implemented method of claim 1, wherein each of the one or more facilities are prioritized based at least in part on a facility type of each of the one or more facilities, and wherein the one or more facilities associated with a refueling facility type are of the highest priority.

9. The computer-implemented method of claim 1, further comprising:
determining, by the computing system, based at least in part on the one or more travel costs, the one or more convenience costs, or the one or more travel criteria, one or more alternative travel routes from the plurality of routes;
generating, by the computing system, the route data comprising information associated with the one or more alternative travel routes; and
generating, by the computing system, one or more alternative indications associated with the one or more alternative travel routes.

10. The computer-implemented method of claim 1, wherein satisfying the one or more travel criteria includes a route of the plurality of routes having one or more road segments that are contiguous between the starting location and the destination.

11. The computer-implemented method of claim 1, wherein the one or more travel criteria comprise the one or more facilities being within a predetermined distance of the plurality of routes, or a type of the one or more facilities being within a predetermined distance of the plurality of routes.

12. The computer-implemented method of claim 1, wherein the one or more indications comprise one or more visual indications or one or more audible indications, and wherein the generating, by the computing system, the one or more indications associated with the travel route comprises:
determining, via the position device, the location of the device in relation to the travel route, wherein the device comprises a vehicle or a navigation device; and
generating, by the computing system, the one or more indications when a distance between the device and the travel route exceeds a threshold distance, the distance being determined based on the location of the device determined via the position device.

13. The computer-implemented method of claim 1, wherein the one or more facilities comprise one or more refueling stations, one or more eating establishments, one or more lavatories, or one or more recreation areas.

14. The computer-implemented method of claim 1, wherein the one or more regions correspond to one or more cells of a Voronoi diagram that is based at least in part on a geographic area comprising the starting location and the destination, and wherein each of the one or more cells of the Voronoi diagram is based at least in part on one or more locations of the one or more facilities in the geographic area.

15. One or more tangible non-transitory computer-readable media storing computer-readable instructions that when executed by one or more processors cause the one or more processors to perform operations, the operations comprising:
   accessing travel data stored in a memory device, the travel data comprising information associated with a starting location and a destination;
   determining a plurality of routes from the starting location to the destination, wherein each of the plurality of routes is associated with one or more regions;
   determining one or more travel costs respectively associated with travelling from the starting location to the destination via each of the plurality of routes;
   determining one or more convenience costs respectively associated with an availability of one or more facilities which are located away from the plurality of routes and within the one or more regions associated with each of the plurality of routes, wherein a convenience cost associated with a respective route among the plurality of routes is determined based on: a positive correlation of a distance between the respective route and each of the one or more facilities located away from the respective route and within the one or more regions associated with the respective route, an inverse correlation of a number of facilities within the one or more regions associated with the respective route, and an inverse correlation of a number of types of facilities within the one or more regions associated with the respective route;
   selecting, based at least in part on the one or more travel costs, the one or more convenience costs, and one or more travel criteria, a travel route from the plurality of routes that is associated with a lowest combination of the one or more travel costs and the one or more convenience costs and that also satisfies the one or more travel criteria, wherein the one or more travel criteria are associated with travel preferences;
   generating route data comprising information associated with the travel route; and
   generating one or more indications associated with the travel route, in response to determining, via a position device, a location of a device in relation to the travel route; and
   controlling one or more vehicle systems of a vehicle based at least in part on the route data to control navigation of the vehicle by causing the vehicle to navigate along the travel route,
   wherein controlling the one or more vehicle systems comprises controlling one or more motor systems, one or more steering systems, or one or more braking systems.

16. The one or more tangible non-transitory computer-readable media of claim 15, wherein the plurality of routes are based at least in part on one or more route constraints that constrain a number of the plurality of routes.

17. The one or more tangible non-transitory computer-readable media of claim 16, wherein satisfying the one or more route constraints comprises a threshold route distance, a threshold route travel time, or a minimum distance to a refueling facility from any location along the plurality of routes, wherein the threshold route distance comprises a maximum route distance based at least in part on a distance between the starting location and the destination, and wherein the threshold route travel time comprises a maximum travel time based at least in part on an estimated travel time between the starting location and the destination.

18. A computing system comprising:
   one or more processors;
   one or more non-transitory computer-readable media storing instructions that when executed by the one or more processors cause the one or more processors to perform operations comprising:
      accessing travel data stored in a memory device, the travel data comprising information associated with a starting location and a destination;
      determining a plurality of routes from the starting location to the destination, wherein each of the plurality of routes is associated with one or more regions;
      determining one or more travel costs respectively associated with travelling from the starting location to the destination via each of the plurality of routes, wherein a convenience cost associated with a respective route among the plurality of routes is determined based on: a positive correlation of a distance between the respective route and each of one or more facilities located away from the respective route and within the one or more regions associated with the respective route, an inverse correlation of a number of facilities within the one or more regions associated with the respective route, and an inverse correlation of a number of types of facilities within the one or more regions associated with the respective route;
      determining one or more convenience costs respectively associated with an availability of the one or more facilities which are located away from the plurality of routes and within the one or more regions associated with each of the plurality of routes;
      selecting, based at least in part on the one or more travel costs, the one or more convenience costs, and one or more travel criteria, a travel route from the plurality of routes that is associated with a lowest combination of the one or more travel costs and the one or more convenience costs and that also satisfies the one or more travel criteria, wherein the one or more travel criteria are associated with travel preferences;
      generating route data comprising information associated with the travel route;
      generating one or more indications associated with the travel route, in response to determining, via a position device, a location of a device in relation to the travel route; and
      controlling one or more vehicle systems of a vehicle based at least in part on the route data to control navigation of the vehicle by causing the vehicle to navigate along the travel route, wherein controlling the one or more vehicle systems comprises controlling one or more motor systems, one or more steering systems, or one or more braking systems.

19. The computing system of claim 18, wherein the one or more facilities are identified based at least in part on use of image content analysis performed by one or more machine-learned models.

20. The computing system of claim 18, wherein controlling the one or more vehicle systems further comprises:
   controlling one or more notification systems.

* * * * *